United States Patent
Stark et al.

(10) Patent No.: US 7,533,152 B2
(45) Date of Patent: *May 12, 2009

(54) METHOD AND SYSTEM FOR CONTENT DRIVEN ELECTRONIC MESSAGING

(75) Inventors: Juergen Stark, Glencoe, IL (US); Craig Goren, Chicago, IL (US)

(73) Assignee: West Notifications Group, Inc., Omaha, NE (US)

( * ) Notice: Subject to any disclaimer, the term of this patent is extended or adjusted under 35 U.S.C. 154(b) by 289 days.

This patent is subject to a terminal disclaimer.

(21) Appl. No.: 11/652,861

(22) Filed: Jan. 12, 2007

(65) Prior Publication Data

US 2007/0192422 A1 Aug. 16, 2007

Related U.S. Application Data

(63) Continuation of application No. 10/385,036, filed on Mar. 10, 2003, now Pat. No. 7,177,909, which is a continuation of application No. 09/661,882, filed on Sep. 14, 2000, now abandoned.

(60) Provisional application No. 60/194,254, filed on Apr. 3, 2000.

(51) Int. Cl.
*G06F 13/00* (2006.01)
*G09G 5/00* (2006.01)

(52) U.S. Cl. .................... 709/206; 709/225; 709/238; 713/170; 715/200

(58) Field of Classification Search ............... 709/206, 709/225, 238, 242; 713/170; 715/200
See application file for complete search history.

(56) References Cited

U.S. PATENT DOCUMENTS 5,400,020 A 3/1995 Jones et al. ............. 340/994
5,623,260 A * 4/1997 Jones ..................... 340/994
5,657,010 A 8/1997 Jones ..................... 340/994

(Continued)

FOREIGN PATENT DOCUMENTS

EP 792 044 A2 8/1997

(Continued)

OTHER PUBLICATIONS

Arbanowski, Stefan and Van Der Meer, Sven, "*Service Personalization for Unified Messaging Systems,*" Computers and Communications, 1999. Proceedings. IEEE International Symposium on Red Sea, Egypt Jul. 6-8, 1999, Los Alamitos, CA, USA, *IEEE Comp. Soc.*, US, Jul. 6, 1999, pp. 156-163.

(Continued)

*Primary Examiner*—Khanh Q Dinh

(57) ABSTRACT

A method and system of electronic messaging is disclosed in which the electronic messaging system is configured such that the message content contains information which will drive the routing decision process. The message itself can be prioritized and routed to a pre-defined communications device or application, even before the recipient of the message has read the message. The sender focuses on the content and MessageML provides the constmcts to tag the content and properly transform it into a viewable format for delivery to the target communications device. A method is disclosed for providing content driven electronic messaging that enables individuals to receive XML electronic messages using an electronic messaging system. Once an Informant Stylesheet and SmartMessage Stylesheet are created, a SmartMessage can be sent to a MessageML Service Provider, who will receive the SmartMessage, process it, and deliver the SmartMessage to a user's defined endpoint.

30 Claims, 22 Drawing Sheets

U.S. PATENT DOCUMENTS

| | | | | |
|---|---|---|---|---|
| 5,668,543 | A | 9/1997 | Jones | 340/994 |
| 5,708,780 | A | 1/1998 | Levergood et al. | 395/200.12 |
| 5,742,763 | A | 4/1998 | Jones | 719/317 |
| 5,796,394 | A | 8/1998 | Wicks et al. | 345/329 |
| 5,819,046 | A | 10/1998 | Johnson | 709/227 |
| 5,870,549 | A | 2/1999 | Bobo, II | 395/200.36 |
| 5,875,437 | A | 2/1999 | Atkins | 705/40 |
| 5,899,995 | A | 5/1999 | Millier et al. | 707/102 |
| 5,937,161 | A | 8/1999 | Mulligan et al. | 395/200.36 |
| 6,029,148 | A | 2/2000 | Zurstrassen | 705/36 |
| 6,052,673 | A | 4/2000 | Leon et al. | 705/38 |
| 6,073,166 | A | 6/2000 | Forsén | 709/206 |
| 6,118,856 | A | 9/2000 | Paarsmarkt et al. | 379/93.24 |
| 6,151,624 | A | 11/2000 | Teare et al. | 709/217 |
| 6,154,738 | A | 11/2000 | Call | 707/4 |
| 6,157,945 | A | 12/2000 | Balma et al. | 709/206 |
| 6,167,409 | A | 12/2000 | DeRose et al. | 715/513 |
| 6,185,603 | B1 | 2/2001 | Henderson et al. | 709/206 |
| 6,212,550 | B1 | 4/2001 | Segur | 709/206 |
| 6,216,165 | B1 | 4/2001 | Woltz et al. | 709/232 |
| 6,219,714 | B1 | 4/2001 | Inhwan et al. | 709/238 |
| 6,240,391 | B1 | 5/2001 | Ball et al. | 704/270 |
| 6,278,936 | B1 | 8/2001 | Jones | 701/201 |
| 6,313,760 | B1 | 11/2001 | Jones | 340/994 |
| 6,314,402 | B1 | 11/2001 | Monaco et al. | 704/275 |
| 6,314,434 | B1 | 11/2001 | Shigemi et al. | 707/203 |
| 6,317,060 | B1 | 11/2001 | Jones | 340/994 |
| 6,347,340 | B1 | 2/2002 | Coelho et al. | 709/246 |
| 6,363,254 | B1 | 3/2002 | Jones et al. | 455/456 |
| 6,363,323 | B1 | 3/2002 | Jones | 701/213 |
| 6,411,891 | B1 | 6/2002 | Jones | 701/201 |
| 6,415,207 | B1 | 7/2002 | Jones | 701/1 |
| 6,430,272 | B1 | 8/2002 | Maruyama et al. | 379/88.22 |
| 6,438,217 | B1 | 8/2002 | Huna | 379/88.14 |
| 6,718,516 | B1 | 4/2004 | Claussen et al. | 715/513 |
| 6,732,330 | B1 | 5/2004 | Claussen et al. | 715/513 |
| 7,177,909 | B2 * | 2/2007 | Stark et al. | 709/206 |
| 2003/0217176 | A1 | 11/2003 | Beunings | 709/238 |
| 2006/0259562 | A1 * | 11/2006 | Stark et al. | 709/206 |
| 2006/0259564 | A1 * | 11/2006 | Stark et al. | 709/206 |

FOREIGN PATENT DOCUMENTS

| | | |
|---|---|---|
| WO | WO 01/76119 A2 | 10/2000 |
| WO | WO 01/75604 A1 | 10/2001 |
| WO | WO 01/76264 A2 | 10/2001 |
| WO | WO 01/80130 A1 | 10/2001 |

OTHER PUBLICATIONS

International Business Machines Corporation: "*Multi-modal data access,*" *Research Disclosure*, Kenneth Publications, Hampshire, GB, vol. 426, No. 114, Oct. 1999, 8 pages.

Patel, Ahmed and Gaffney, Kevin, "A technique for multi-network access to multimedia messages," *Computer Communications*, Elsevier Science Publishers BV, Amsterdam, NL, vol. 20, No. 5, Jul. 1, 1997, pp. 324-337.

Van Der Meer, Sven, Arbanowski, Stefan and Magedanz, Dr. Thomas, "*An Approach for a 4th Generation Messaging System,*" Autonomous Decentralized Systems, 1999. Integration of Heterogeneous Systems. Proceedings. The Fourth International Sysmpsium on Tokyo, Japan, Mar. 21-23, 1999, Los Alamitos, CA, USA, *IEEE Comp. Soc.*, US, Mar. 21, 1999, 10 pages.

*Computer Communications*, vol. 20, (1997), pp. 324-337, "*A Technique for multi-network access to Multimedia Messages*" by Patel et al.

\* cited by examiner

| FIG. 3C-1 | FIG. 3C-2 |

| EXAMPLE PROCESSING RULES (FOR 1 SUBSCRIBER) | 2-WAY POTENTIAL |
|---|---|
| SEND TO ASSISTANT'S EMAIL; UPDATE "FOLIO" ON CENTERPOST<br>SEND TO HOME FAX ON EVENING PRIOR TO TRIP<br>SEND TO PAGER AND COPY ASSISTANT'S FAX; TO MOBILE PHONE ON WEEKENDS<br>SEND TO PAGER; UPDATE PALMPILOT SCHEDULE<br>SEND TO PAGER; SEND TO ASSISTANT'S FAX<br>CONSOLIDATE AND SEND WEEKLY SUMMARY TO HOME EMAIL | REBOOK OTHER FLIGHT |
| SEND TO HOME EMAIL; SEND URGENT TAGLINES TO PAGER<br>SEND CHART TO WORK EMAIL; UPDATE "FOLIO" ON CENTERPOST; ENABLE QUERY<br>SEND TO HOME EMAIL; SEND TO PCS PHONE FOR EXTREME MOVEMENTS<br>SEND TO PAGER; REQUEST SHARES TO BUY/SELL<br>SEND TO HOME EMAIL | SEND DETAILS<br>EXECUTE TRADE<br>EXECUTE TRADE<br>RENEW POSITION |
| SEND TO HOME FAX<br>SEND TO PAGER; CALL HOME PHONE<br>UPDATE "FOLIO" ON CENTERPOST; UPDATE QUICKEN REGISTER | TRANSFER FUNDS<br>FREEZE ACCOUNT |
| CONSOLIDATE AND SEND WEEKLY SUMMARY ON FRIDAYS TO HOME EMAIL<br>SEND TO HOME EMAIL; DELETE WHEN EXPIRED<br>SEND TO HOME FAX<br>SEND TO HOME FAX | PURCHASE ITEM<br>PURCHASE ITEM<br>HOLD AT STORE |
| SEND TO WORK EMAIL "SHIPMENTS" FOLDER; SEND TO ASSISTANT'S EMAIL<br>UPDATE "FOLIO" ON CENTERPOST; ENABLE QUERY TO FOLIO | |
| SEND TO ALL DEVICES; ALSO SEND TO WIFE'S CENTERPOST ACCOUNT<br>UPDATE "FOLIO" ON CENTERPOST<br>SEND TO HOME EMAIL | |
| FOLLOW ESCALATION SCHEDULE; UPDATE CENTRAL "FOLIO"<br>SEND TO WORK EMAIL<br>SEND TO PAGER | WILL RESPOND |
| SEND TO PAGER; PING WIFE'S CENTERPOST; CALL NEIGHBOR PHONE<br>SEND TO PAGER OR CELLPHONE<br>FOLLOW ESCALATION SCHEDULE; UPDATE CENTRAL "FOLIO"<br>UPDATE MAP ON WORK PC | FALSE ALARM<br>WILL RESPOND |
| ROUTE BASED ON VARIOUS CRITERIA; SEND SUBJECT TO PAGER IF URGENT<br>UPDATE ADDRESS BOOK ON PALM VII, PCS PHONE, AND HOME EMAIL<br>UPDATE SCHEDULE ON PALM VII; SEND TO PAGER IF URGENT | REPLY TO EMAIL |

METHOD AND SYSTEM FOR CONTENT DRIVEN ELECTRONIC MESSAGING

This non-provisional application is a continuation of application Ser. No. 10/385,036, filed on Mar. 10, 2003, now U.S. Pat. No. 7,177,909 which is a continuation of prior application Ser. No. 09/661,882, filed on Sep. 14, 2000, now abandoned which claims the benefit of the provisional application Ser. No. 60/194,254, entitled Consumer XML Message Processing Platform, filed on Apr. 3, 2000.

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Cross reference is made to a related invention disclosed in U.S. patent application entitled Individual XML Message Processing Platform, filed concurrently, the subject matter of which is owned by the present applicants and the teachings of which are incorporated herein by reference.

Cross reference is also made to a related invention disclosed in U.S. patent application entitled Method of Controlling Access to Personal Resources, filed concurrently, the subject matter of which is owned by the present applicants and the teachings of which are incorporated herein by reference.

BACKGROUND OF THE INVENTION

The present invention pertains to a system of electronic messaging, and more specifically the present invention pertains to a system and method of electronic messaging configured such that the message contains XML tags which will drive how the message is processed, including how it is routed, formatted, displayed, organized, and otherwise handled. The system, MessageML, operates in conjunction with a specialized message processing platform to enable individuals to receive, store, synthesize and intelligently process XML-based electronic messages and standard SMTP electronic mail (email) messages from corporations or any other senders in a way that fully integrates individuals' existing email boxes, cell phones, pagers, fax machines, telephones, and other devices. MessageML provides the constructs to tag the message content so that the processing platform understands the meaning of the content and thus how the message should be processed. The message processing platform is described in a patent application filed concurrently herewith, entitled Individual XML Message Processing Platform, and incorporated herein by reference.

Despite the limitations of existing technologies, the electronic communications market is enormous and growing very rapidly. There are over 260 million email boxes worldwide and 9.2 billion messages sent daily in the United States alone. Mobile data appliances are likewise growing rapidly with over 208 million digital wireless phone subscribers worldwide today. Similarly, Internet appliances are expected to explode to 55 million connected devices by 2002. As shown in FIG. 1, there exists a need for a new communications platform capable of fully integrating individuals' existing email boxes, cell phones, pagers, fax machines, telephones, and other devices, to take full advantage of these exploding markets. In order to do this intelligently, a more robust, forward-looking messaging structure is needed.

A novel electronic messaging system is needed by businesses and consumers due to 1) inherent limitations of current electronic mail systems, 2) lack of integration between consumer "endpoints" (email addresses, wireless devices, fax machines, etc.) and 3) exploding electronic communications complexity.

First, email is not a suitable medium for corporations to interact with their customers in anything but a "newsletter" fashion. Email does not, by definition, contain anything more intelligent than a sender's address, an urgent/non-urgent tag, a subject line, and a text body. Email, by definition, typically goes into a user's single inbox where it is opened, read, and stored or deleted. Once more and more corporations send their customers email messages, the receiver quickly has a problem with inbox overload. Email also cannot be relied upon for urgent messages or alerts since users check email with varying frequency. Further, email cannot be easily automatically sorted, synthesized, filed, re-formatted or summarized.

Today, in order to automatically file or process incoming email, a user has to manually set up message-specific rules such as a search of the subject line or specify an action based on a specific sender's address. As corporations and individuals send increasing volumes of electronic messages, a more intelligent way to process, store, and synthesize these messages is needed. It will not be convenient, for example, to open every message from a person's credit card vendor to see that payments have been posted, transactions have been processed, or bills have been mailed. These messages should be intelligently stored so that the consumer can view a synthesized status or see detail if desired.

Second, many individuals use a variety of electronic communication addresses for their email boxes, wireless phones, pagers, fax machines, instant messaging, etc. There is no way to effectively and intelligently integrate those devices: pagers, email boxes, telephones, and fax machines are ignorant of each other. There are webmail and email solutions that will forward email messages to pagers or cell phones or convert email text to a fax message or a voice message. None of these solutions intelligently determine the correct destination of each specific incoming message without the user's manual control or message-specific rules being setup beforehand. Existing services, for example, will not automatically understand that a flight cancellation alert should go to any device a receiver has that is likely to deliver the message immediately but a special fares notice from the same airline should go to a lower immediacy, less intrusive device. Many unified messaging solutions force users to give up existing addresses and phone numbers and do not process intelligent incoming messages. These platforms only enable the receiver to convert and listen to messages from a variety of platforms. While some will find a subscriber by trying multiple phone numbers, there is no real intelligent routing based on the content of the incoming message since the incoming message is generally a voicemail or an email.

Third, communications complexity is exploding for corporations and individuals. New "connected" devices are being introduced every day—each with different capabilities, formatting, protocol requirements, and addresses. Individuals have new choices in the types of information they can receive and the devices upon which that information can be received and viewed. Existing message connections between individuals and/or corporations are typically point-to-point. If a corporation wants to send a message to a customer's pager, that corporation sends a message directly to that pager's address. Likewise if an individual wants to send a text message to a friend's specific endpoint, that person in many cases has to know and remember multiple email addresses, a PCS wireless phone text address, a fax number, a pager number, etc. If the receiving individual ever changes pagers or wireless phone providers, that individual has to remember to provide all possible sending parties with the new device-specific address.

As wireless PDAs, cars, home appliances, and other devices all begin to have their own electronic messaging address, the existing point-to-point, address-specific messaging approach will become extremely burdensome and complex for senders and receivers. Additional complexity will be generated by the introduction of features such as device sensing and endpoint location sensing technologies. This problem is exacerbated by the need to limit access to a specific individual's communications world but enable access for friends and family without having to share passwords. FIG. 2 shows these above-listed limitations on the current state of electronic messaging.

Certain of the advanced messaging capabilities enabled by MessageML can be performed today within corporations. For example, intra-company messaging on a single platform often provides for sophisticated formatting, integrated calendar management, and other applications. However, these capabilities are lost entirely once messages are sent to recipients outside the corporate network. To address this problem, a new messaging standard is needed. MessageML will not only give all users the capabilities that currently exist on intra-company messaging platforms, but also add dramatically to that level of functionality.

SUMMARY OF THE INVENTION

The present invention is a novel system and method for transmitting electronic messages. The MessageML system is based upon the extensible Markup Language (XML). The system is a precise XML vocabulary that can be utilized by a messaging platform to processes messages based on the meaning of their content and interpretation of the accompanying messaging vocabulary. The system provides a configuration whereby the message content contains information to, among other things, drive the how the message is processed. The sender of the message creates the actual content of the message and uses the MessageML vocabulary to tag the content with meaning so that the message may be properly processed.

MessageML is a new electronic communications standard that applies XML, the widely accepted language of e-commerce, to messaging. MessageML is a precise XML vocabulary applied to messages to individuals. Unlike emails based on the current SMTP standard, which simply contain text content, MessageML messages contain a set of self-descriptive attributes that convey what the message's content means. Processing engines can use these attributes to intelligently manipulate and process the message, permitting advanced functionality such as routing of messages to any electronic device or messaging account; automatic formatting for various communications devices; automatic self-organization of messages within inboxes; and numerous other applications.

MessageML messages contain embedded XML tags that describe certain attributes of that message. A MessageML message processing platform matches the attributes of an incoming MessageML message with information about a recipient's communication devices and how they are used to intelligently route, format, and deliver the message. More specifically, messages composed using the MessageML vocabulary and architecture contain raw data and XML tags that describe that message's particular attributes, such as its reach, immediacy, sensitivity, content, expiration, and context. The message processor examines this meta-data in processing the message. The message processor also interrogates meta-data about the sender and about the type of message, which are contained in stylesheets residing on the sender's server. The sender attributes comprise items such as the sender's name, website address, and industry category, while the message type attributes include the type of activity the message represents (e.g. Travel Itinerary) and how those messages should be displayed on various communications devices. By applying the sender's stylesheets to the smart message itself and factoring in the recipient's device preferences, the message processor determines how the message should be routed, formatted, prioritized, and delivered.

A SmartMessage (a message constructed using the MessageML vocabulary) is an electronic message that provides a single, standard envelope to deliver its content to a host of communications devices and applications, referred to in this document as target communications devices or endpoints. These endpoints include mobile phones with messaging capability, wireless PDAs, pagers, fax machines, PC email inboxes, instant messaging applications, and standard telephones. The MessageML architecture separates the content from the presentation, and allows the sender to define how its message content should be displayed to the user on these various endpoints. The Informant (a sender of a MessageML message) codes the message in XML only once, and that same message would be sent to a pager or an email account in HTML format, or to any other communications device, depending on the recipient's preferences, and displayed properly on each of these devices.

The present invention works in conjunction with communications platforms, and in particular, the communications platform known as a "MessageML Processing Platform", of which the "Centerpost Platform" is one example of this type of platform. When used in conjunction with a communications platform, the novel electronic messaging system enables individuals to receive, store, synthesize, format and intelligently process XML-based electronic messages and standard SMTP email from corporations or any other senders in a way that fully integrates individuals' existing email boxes, cell phones, pagers, fax machines, telephones, and other devices. This novel electronic messaging system used in conjunction with a communications platform reduces complexity, lowers costs, and increases capabilities for corporations that interact electronically with their customers.

The system along with the communications platform enables many valuable notification applications for corporations such as airlines, brokerages, financial institutions, and retailers, among others. For individuals, the present invention delivers valuable information while simplifying the management of all electronic communications. The communications platform, used in conjunction with the present invention, enables corporations and third parties to define and create applications using a common, centralized platform. The novel system can be used 1) by individuals via a web-mail like offering, 2) by telecommunications and internet service providers on a hosted or licensed basis, 3) by corporations on a hosted or licensed basis, or 4) by other service providers on a hosted or licensed basis.

FIG. 3A shows a schematic view of a communications platform utilizing certain aspects of the present invention, to allow the transmission of electronic messages between corporations and individuals. This novel system along with the communications platform is also intended to function between corporations, and between individuals, and is not merely limited to communications between corporations and individuals. FIG. 3B shows some examples of the flow of communication using such a centralized, user-centric hub, along with the novel system described herein. FIG. 3C lists some of the example interactions using the communications platform along with the electronic messaging system of the present invention.

DETAILED DESCRIPTION OF THE FIGURES

DETAILED DESCRIPTION OF THE INVENTION

Figure 1:
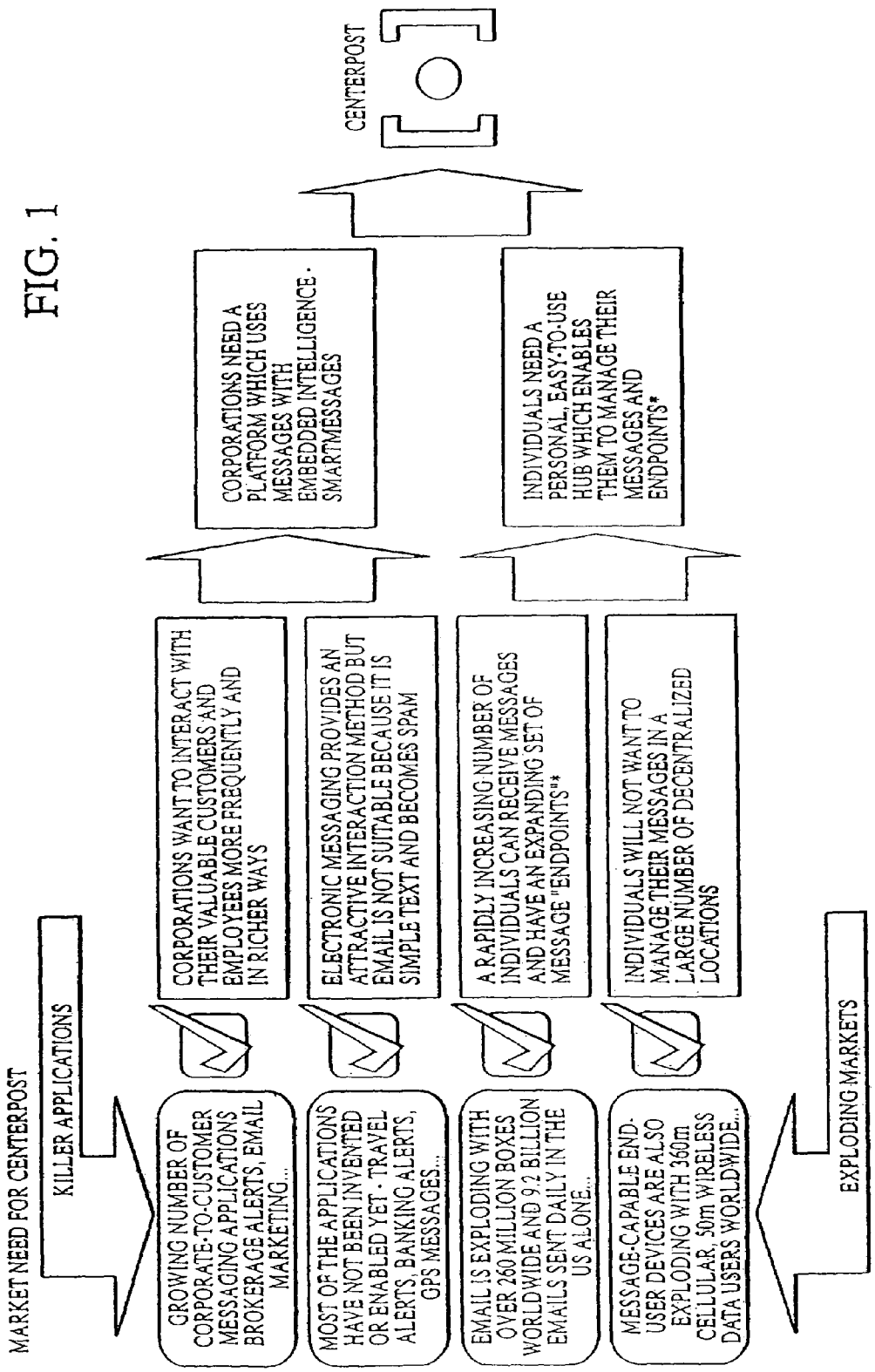
FIG. 1 is a block diagram detailing the need for a novel communications platform capable of utilizing intelligent messages and integrating endpoints.
Figure 2:
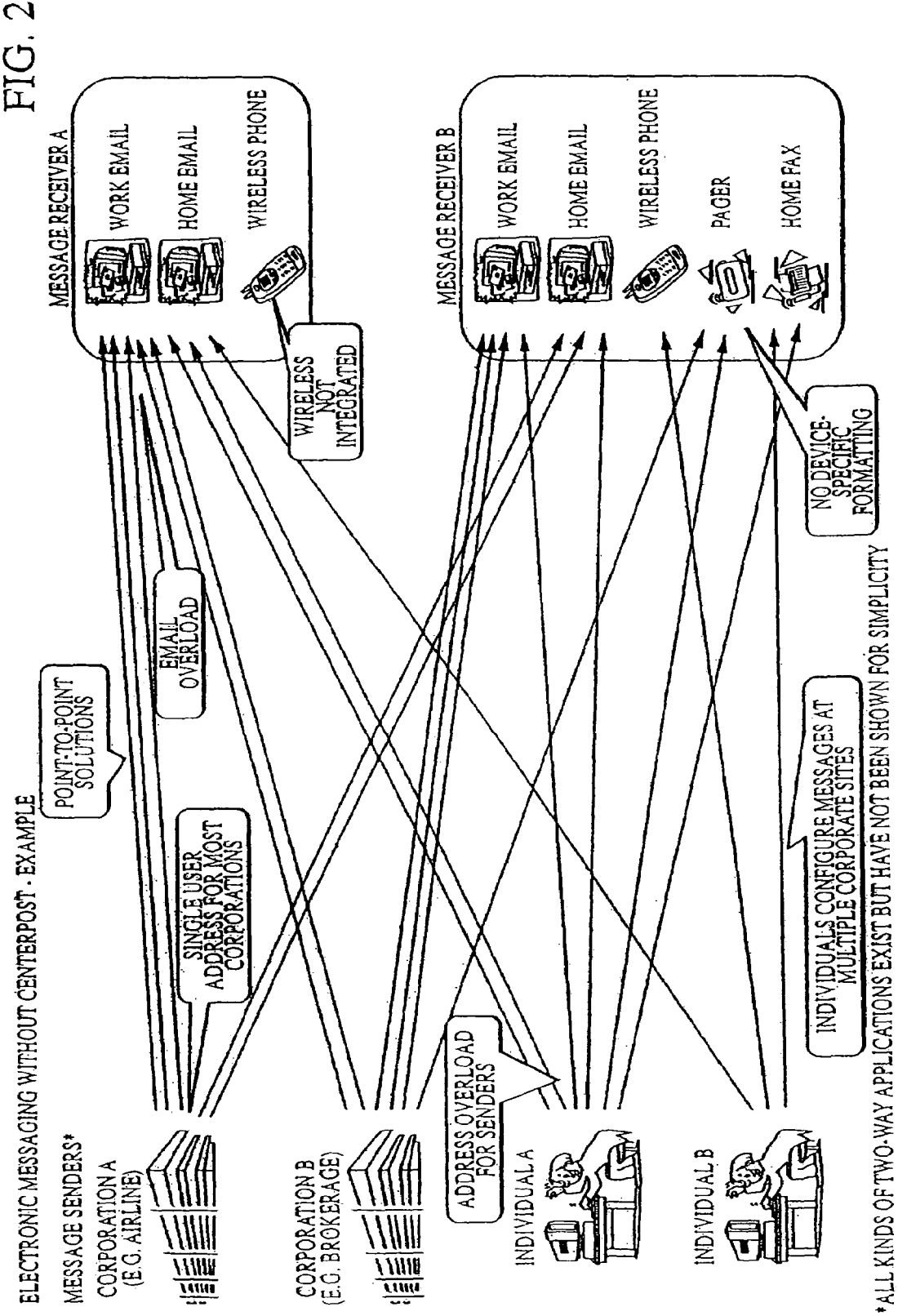
FIG. 2 is a schematic diagram displaying electronic messaging without the novel communications platform.

The novel electronic messaging system or MessageML system is a new type of electronic messaging. It provides a configuration whereby message content contains information that drives how the message is processed. This means that even before a user reads a message, it has been prioritized, formatted, and routed to a pre-defined communications device or application. The sender of the message creates the actual content of the message and, using the MessageML vocabulary, tags the content with meaning to enable intelligent processing of the message based on the meaning of the content. MessageML tags can be used to define message attributes, associate multiple messages with each other, allow precise message formatting, enable the definition and publishing of message classes, define possible responses and how a reply should be delivered, enable and/or disable specific endpoint types, provide a security layer, pre-configure users and endpoints, extensibly tag raw content, define stylesheets, define messaging handling characteristics (e.g., message expiration), define message senders, define message receipt notifications, etc. The MessageML system is based upon the eXtensible Markup Language (XML).

The system is a precise XML vocabulary that can be utilized by a messaging platform to process messages based on the meaning of their content and interpretation of the accompanying messaging vocabulary. The system provides a configuration whereby the message content contains information to, among other things, determine how the message is processed. The sender of the message creates the actual content of the message and uses the MessageML vocabulary to tag the content with meaning so that the message may be properly processed.

MessageML is a new electronic communications standard that applies XML, the widely accepted language of e-commerce, to messaging. MessageML is a precise XML vocabulary applied to messages to individuals. Unlike emails based on the current SMTP standard, which simply contain text content, MessageML messages contain a set of self-descriptive attributes that convey what the message's content means. Processing engines can use these attributes to intelligently manipulate and process the message, permitting advanced functionality such as routing of messages to any electronic device or messaging account; automatic formatting for various communications devices; automatic self-organization of messages within inboxes; and numerous other applications.

MessageML messages contain embedded XML tags that describe certain attributes of that message. A MessageML message processing platform matches the attributes of an incoming MessageML message with information about a recipient's communication devices and how they are used to intelligently route, format, and deliver the message. More specifically, messages composed using the MessageML vocabulary and architecture contain raw data and XML tags that describe that message's particular attributes, such as its reach, immediacy, sensitivity, content, expiration, and context. The message processor examines this meta-data in processing the message. The message processor also interprets meta-data about the sender and about the type of message, which are contained in stylesheets residing on the sender's server. The sender attributes comprise items such as the sender's name, website address, and industry category, while the message type attributes include the type of activity the message represents (e.g. Travel Itinerary) and how those messages should be displayed on various communications devices. By applying the sender's stylesheets to the smart message itself and factoring in the recipient's device preferences, the message processor determines how the message should be routed, formatted, prioritized, and delivered.

The XML standard is defined by the W3C (http://www.w3.org/XML/Schema), a consortium created in October 1994 to lead the World Wide Web to its full potential by developing common protocols that promote its evolution and ensure its interoperability. The standard provides a means for defining the structure, content and semantics of XML documents.

Figure 4:
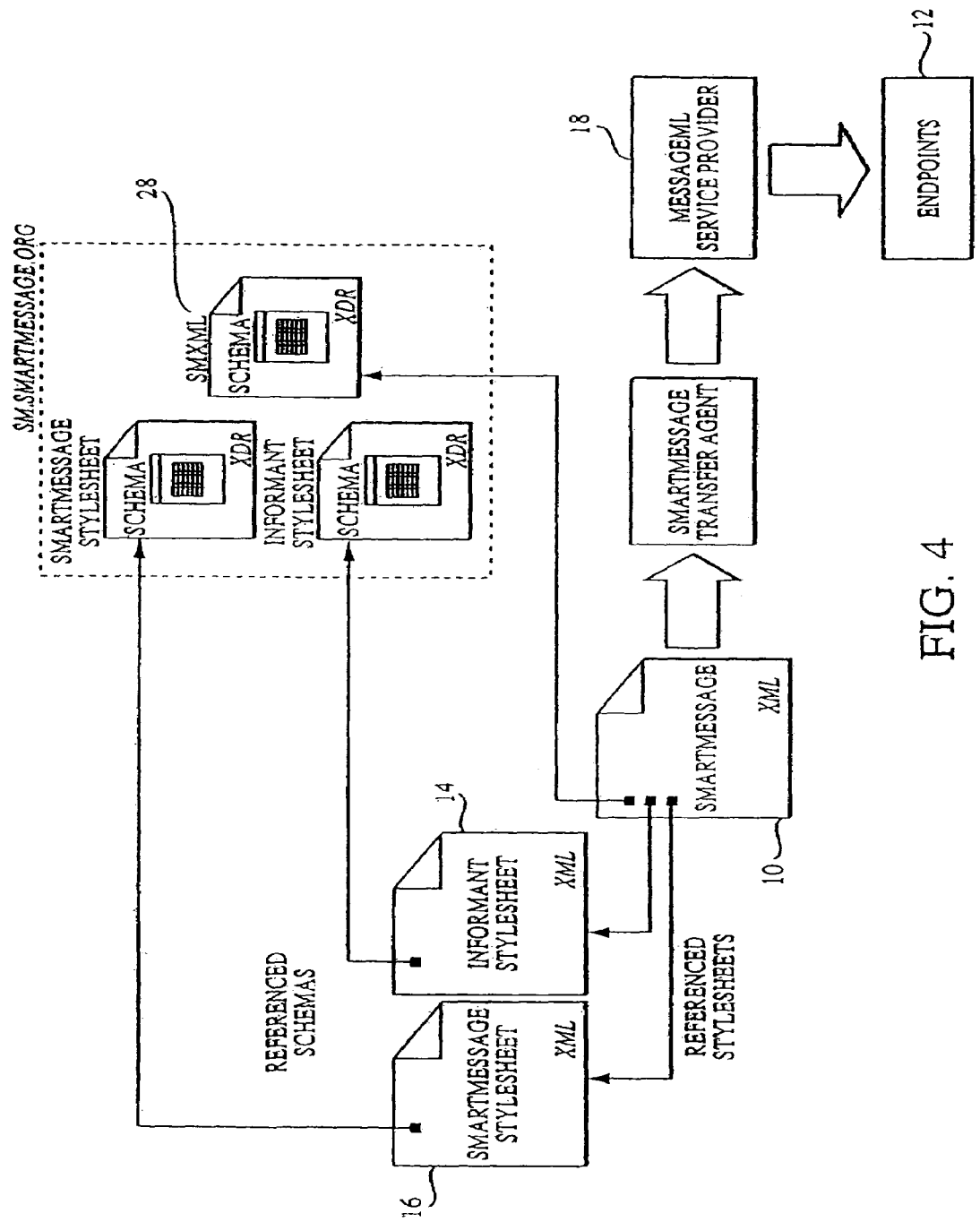
FIG. 4 is a block diagram illustrating the interrelationship between the elements of the SmartMessage of the present invention.

FIG. 4 illustrates the relationship between the elements comprising the MessageML design. The SmartMessage 10 is central to the entire architecture.

A SmartMessage 10 is an electronic message that provides a single, standard envelope to deliver its content to a host of communications devices and applications, referred to in this document as target communication devices or endpoints 12. These endpoints 12 include mobile phones with messaging capability, wireless PDAs, pagers, fax machines, PC email inboxes, instant messaging applications, and standard telephones. Thus, in terms of its XML coding, a SmartMessage 10 would look the same regardless of whether it was sent to a pager or to an email account in HTML format. The MessageML architecture separates the content from the presentation, and allows the sender to define how its message content should be displayed to the user on these various endpoints 12.

A SmartMessage 10 also contains a robust set of self-descriptive attributes or meta-data about its content. By examining this meta-data, a processing platform or recipient can determine how the message should be handled, for example, how the message should be prioritized, handled, formatted, and delivered.

The MessageML system also incorporates message stylesheets that are applied to the message content. These stylesheets are used to create communication-device specific message formats. By separating the content from the presentation, the contents of a SmartMessage 10 can be transformed to any other presentation format. This allows the MessageML system to inter-operate and leverage other proprietary and XML-based communications formats. For example, a SmartMessage 10 could be sent to a WAP-enabled phone by transforming its contents to WML or a speech recognition dialog could be initiated over a telephone by transforming a SmartMessage 10 into a VoiceXML document.

Accordingly, it becomes easier for both the MessageML Service Provider and their recipients to manage, receive, route, and interact with electronic messages.

Figure 5:
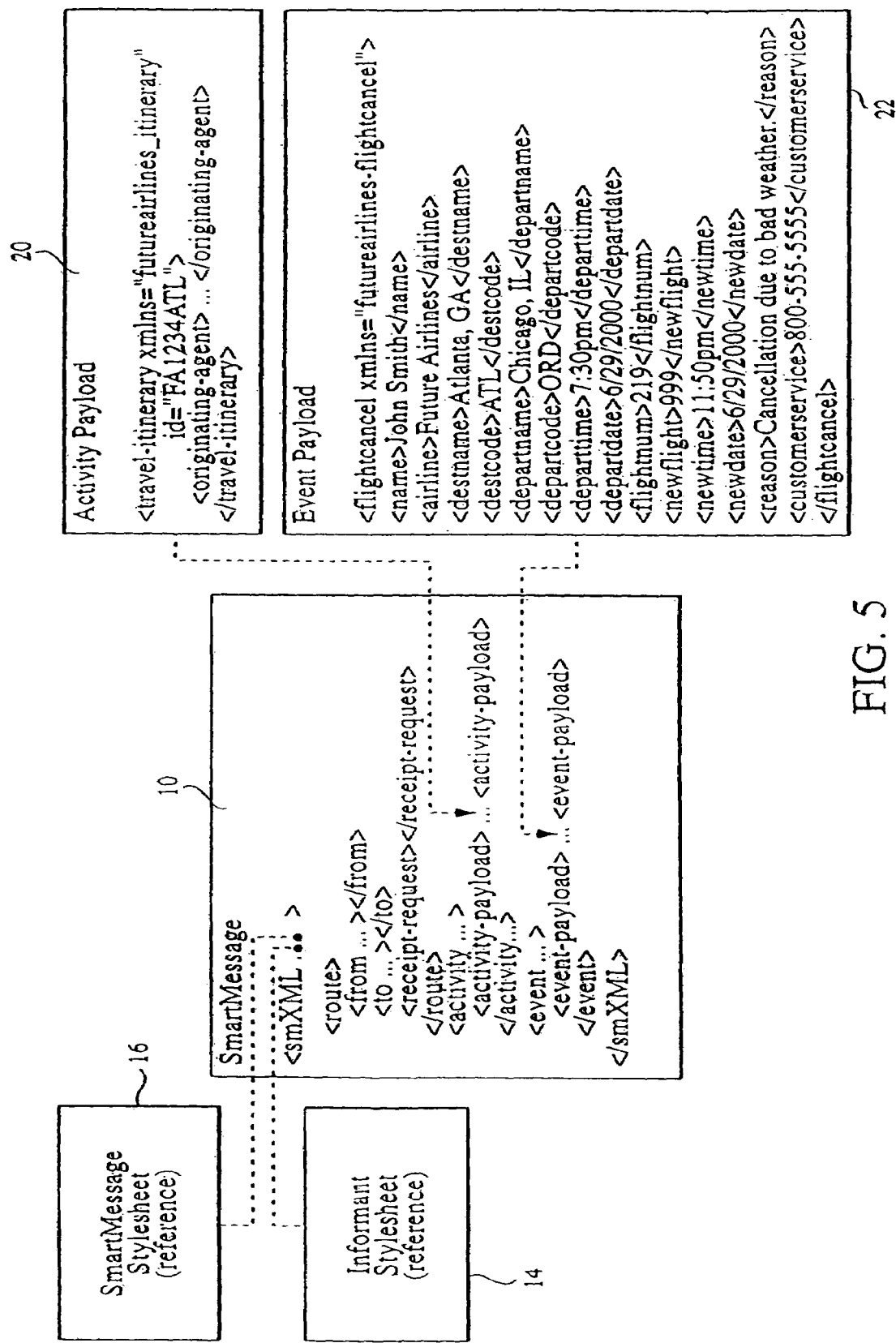
FIG. 5 is a block diagram illustrating the interrelationship between the SmartMessage, the Stylesheets, and the activity and event payloads of the present invention.

As evidenced from the above process flow, there are many different elements and entities involved in delivering a SmartMessage 10. As described above, the SmartMessage document 10 is the main element of the MessageML system or architecture. In simple terms, a SmartMessage 10 is a well-formed XML document with a robust set of attributes that define and describe the embedded message content, which itself is a well-formed XML document. MessageML refers to its message content as its payload. FIG. 5 illustrates the inter-relationship between the SmartMessage 10, the Stylesheets, and the activity 20 and event 22 payloads.

The SmartMessage 10 itself has no meaningful interpretation without some type of definition. The definition is needed so that the recipient of the message can make decisions about how to handle the message before they read it. For example, the MessageML system provides the necessary constructs to provide certain information to the recipient even before the message is opened, i.e., whom the message is from, whether or not it is a flight cancellation, bank overdraft notification, etc., where to route the message, and what format to display itself.

MessageML definitions are created prior to sending a SmartMessage 10 and the definitions reside in the Informant Stylesheet 14 and SmartMessage Stylesheet 16. The SmartMessage 10 has a reference to the appropriate Informant Stylesheet 14 and SmartMessage Stylesheet 16. As described below, this association identifies the SmartMessage 10 with a specific Informant, activity class, event class, and validating XML schemas.

The first step in the SmartMessage process is for the sender to create an Informant Stylesheet 14. The Informant Stylesheet 14 defines meta-data about the Informant and the Informant's valid sources or locations from where its associated SmartMessages 10 can originate. This document is stored on the Informant's web server (not shown). Next, the Informant creates a SmartMessage Stylesheet 16 for each type of activity class it wishes to deliver to its recipients. For example, the Informant may create a SmartMessage Stylesheet 16 for travel, and could entitle this activity class "Travel Itinerary". Within each activity class is a collection of event classes (or message types) associated with that activity class, so "Flight Cancellation", "Itinerary Change", etc. could be events within the "Travel Itinerary" activity. The Informant defines what the message content or payload looks like for each event class by defining their XML schemas, which are embedded within the SmartMessage Stylesheet 16. XSL documents are also created and embedded into the SmartMessage Stylesheet 16 to define how each event's payload should be displayed to the various endpoints 12. This document is also stored on the Informant's web server.

The MessageML system users sign up to receive SmartMessages 10 from an Informant with a MessageML Service Provider 18. Each SmartMessage user decides where the Informant's various SmartMessage event classes are to be delivered, specifically to which of the user's endpoints 12. The Informant then creates and sends a SmartMessage 10 to a set of SmartMessage user accounts hosted by this MessageML Service Provider 18. The MessageML Service Provider 18 receives, processes and delivers the SmartMessage 10 to the specified endpoint 12 of each addressed user.

The Informant Stylesheet 14 defines information about the Informant or sender of the information and its valid transport sources or locations from where it will send its messages. For each source the allowable Internet access protocol is also defined. Further, the SmartMessage Stylesheet 16 defines the message payload's meta-data and structure, as well as how it should be rendered using XSL for the various endpoints 12.

The main role of the Informant Stylesheet 14 is to provide information about and authenticate the sender of the message. The Informant Stylesheet 14 also contains meta-data about the Informant itself, such as its name, website address, industry category, etc. When a MessageML Service Provider 18 receives a SmartMessage 10 from a sender, the Service Provider can check the physical IP address, domain, or SMTP email account from which the SmartMessage 10 was received. If the source address matches one of the entries in the Informant Stylesheet 14, it is considered authentic, otherwise, the message is rejected.

The Informant Stylesheet 14 usually resides on the Informant's web server and is versioned by its filename. For example, the Informant Stylesheet http://smartmessage.messageml.org/stylesheets/informant/v1-0.xml describes version 1.0 of the document.

The SmartMessage Stylesheet 16 serves three main functions. First, it defines activity and event class meta-data and organization. Second, it defines the XML schemas of the activity 24 and event class 26 payloads or content 20, 22. Third, it defines how the payload 20, 22 is rendered via XSL for specific endpoints 12.

Figure 6:
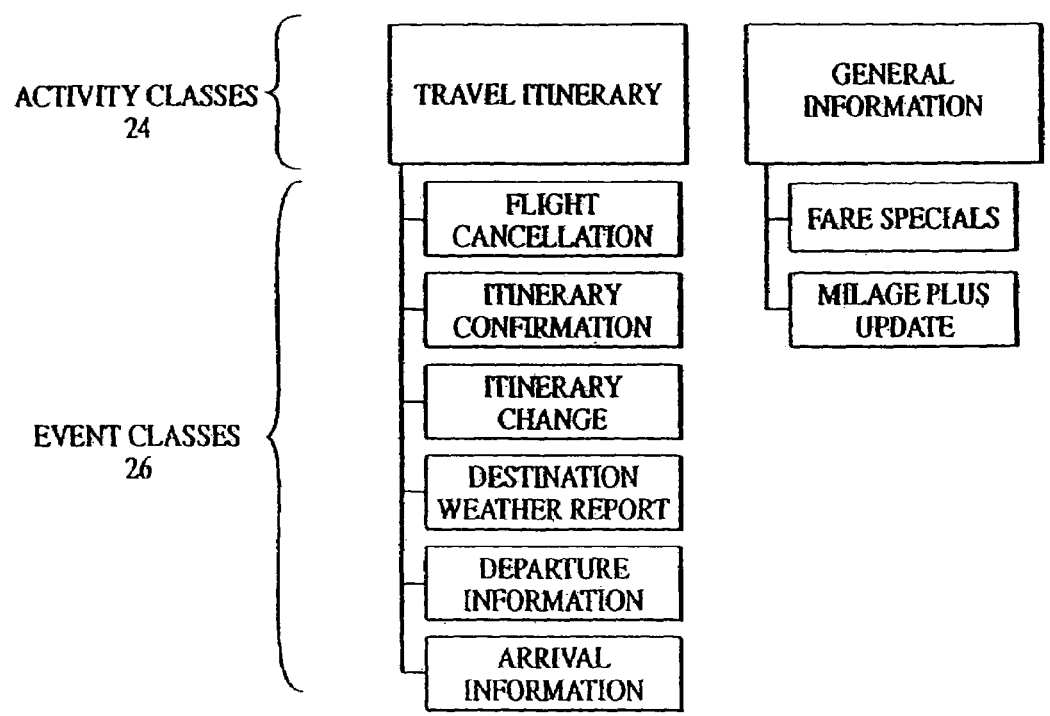
FIG. 6 is a block diagram illustrating the interrelationship between activity classes and event classes of the present invention.

As discussed above, an activity class 24 is a grouping of event classes 26. For example, the activity class 24 called Travel Itinerary would have several event classes 26 associated with it. These may include flight cancellations, flight changes, rental car and hotel confirmations, and the like. An event class 26 can belong to one and only one activity class 24. FIG. 6 illustrates the relationship between activity classes 24 and event classes 26.

Activity classes 24 and event classes 26 also have meta-data describing their duration and frequency. This information can be used to understand the timeliness of the message itself. Also, an event class 26 has additional meta-data about its purpose, sensitivity, reach, immediacy, and category. This information can be used to filter SmartMessages 10 and specify routing rules and instructions.

When an update is needed, all new SmartMessages 10 would change their reference to point at the new SmartMessage Stylesheet version, for example, from itinerary-v1-0.xml to itinerary-v1-1.xml. This design maintains backward compatibility.

The XML schemas define the structure of the SmartMessage payload. These XML schemas are embedded within the SmartMessage Stylesheet 16 in the <activity-payload-schema> and <event-payload-schema> elements. These schemas follow the XML Schema format as defined by the W3C, as described above. The activity payload 20 describes information common to all its event classes 26, and event payload 22 describes information specific to that event instance.

Examples of SmartMessage Schemas (SmartMessage 10, SmartMessage Stylesheet 16, and Informant Stylesheet 14) are as follows:

SmartMessage:

```
<?xml version="1.0"?>
<!-- smartmessage schema -->
<Schema name="v1-1.xdr" xmlns="urn:schemas-microsoft-com:xml-data"
    xmlns:dt="urn:schemas-microsoft-com:datatypes">
  <ElementType name="smXML" content="eltOnly" order="seq">
    <AttributeType name="smartmessage-date" dt:type="dateTime" required="yes"/>
    <AttributeType name="smartmessage-stylesheet-class" dt:type="string"
        required="yes"/>
    <AttributeType name="informant-stylesheet-version" dt:type="string"
        required="yes"/>
    <AttributeType name="smartmessage-id" dt:type="string" required="yes"/>
    <AttributeType name="protocol-version" dt:type="string" required="yes"/>
    <AttributeType name="smartmessage-stylesheet-version" dt:type="string"
        required="yes"/>
    <AttributeType name="informant-stylesheet-class" dt:type="string"
        required="yes"/>
    <attribute type="smartmessage-date"/>
    <attribute type="smartmessage-stylesheet-class"/>
    <attribute type="informant-stylesheet-version"/>
    <attribute type="smartmessage-id"/>
    <attribute type="protocol-version"/>
    <attribute type="smartmessage-stylesheet-version"/>
    <attribute type="informant-stylesheet-class"/>
    <element type="route"/>
    <element type="activity"/>
    <element type="event"/>
  </ElementType>
  <ElementType name="route" content="eltOnly" order="seq">
    <element type="from"/>
    <element type="to" minOccurs="1" maxOccurs="*"/>
    <element type="receipt-request" minOccurs="0" maxOccurs="*"/>
  </ElementType>
  <ElementType name="from" content="empty">
    <AttributeType name="reply-address" dt:type="string"/>
    <AttributeType name="reply-protocol" dt:type="enumeration"
        dt:values="http smtp" default="smtp"/>
    <AttributeType name="from-address" dt:type="string" required="yes"/>
    <attribute type="reply-address"/>
    <attribute type="reply-protocol"/>
    <attribute type="from-address"/>
  </ElementType>
  <ElementType name="to" content="empty">
    <AttributeType name="to-type" dt:type="enumeration" dt:values="to cc bcc"
        default="to"/>
    <AttributeType name="to-protocol" dt:type="enumeration" dt:values="http smtp"
        default="smtp"/>
    <AttributeType name="to-address" dt:type="string" required="yes"/>
    <attribute type="to-type"/>
    <attribute type="to-protocol"/>
    <attribute type="to-address"/>
  </ElementType>
  <ElementType name="receipt-request" content="empty">
    <AttributeType name="receipt-type" dt:type="enumeration"
        dt:values="ack nak retry" default="nak"/>
    <AttributeType name="receipt-protocol" dt:type="enumeration"
        dt:values="http smtp" default="smtp"/>
    <AttributeType name="receipt-event" dt:type="string"/>
    <AttributeType name="receipt-address" dt:type="string" required="yes"/>
    <attribute type="receipt-type"/>
    <attribute type="receipt-protocol"/>
    <attribute type="receipt-event"/>
    <attribute type="receipt-address"/>
  </ElementType>
```

```
<ElementType name="activity" content="eltOnly" order="seq">
  <AttributeType name="activity-title" dt:type="string" required="yes"/>
  <AttributeType name="activity-id" dt:type="string" required="yes"/>
  <AttributeType name="closed-date" dt:type="dateTime" required="yes"/>
  <AttributeType name="activity-class" dt:type="string" required="yes"/>
  <AttributeType name="activity-status" dt:type="string" required="yes"/>
  <AttributeType name="activity-url" dt:type="string" required="yes"/>
  <attribute type="activity-title"/>
  <attribute type="activity-id"/>
  <attribute type="closed-date"/>
  <attribute type="activity-class"/>
  <attribute type="activity-status"/>
  <attribute type="activity-url"/>
  <element type="activity-payload"/>
</ElementType>
<ElementType name="activity-payload" content="eltOnly" order="seq"/>
<ElementType name="event" content="eltOnly" order="seq">
  <AttributeType name="event-description" dt:type="string" required="yes"/>
  <AttributeType name="event-class" dt:type="string" required="yes"/>
  <AttributeType name="event-id" dt:type="string" required="yes"/>
  <AttributeType name="event-url" dt:type="string" required="yes"/>
  <attribute type="event-description"/>
  <attribute type="event-class"/>
  <attribute type="event-id"/>
  <attribute type="event-url"/>
  <element type="event-payload"/>
</ElementType>
<ElementType name="event-payload" content="eltOnly" order="seq"/>
</Schema>
  SmartMessage Stylesheet:
<?xml version="1.0"?>
<!-- smartmessage stylesheet -->
<Schema name="v1-1.xdr" xmlns="urn:schemas-microsoft-com:xml-data"
    xmlns:dt="urn:schemas-microsoft-com:datatypes">
  <ElementType name="smSmartMessageStylesheet" content="eltOnly" order="seq">
    <AttributeType name="smartmessage-stylesheet-class" dt:type="string"
        required="yes"/>
    <AttributeType name="smartmessage-stylesheet-version" dt:type="string"
        required="yes"/>
    <attribute type="smartmessage-stylesheet-class"/>
    <attribute type="smartmessage-stylesheet-version"/>
    <element type="activity-class" minOccurs="1" maxOccurs="*"/>
  </ElementType>
  <ElementType name="activity-class" content="eltOnly" order="seq">
    <AttributeType name="activity-name" dt:type="string" required="yes"/>
    <AttributeType name="activity-duration" dt:type="enumeration"
        dt:values="hours days weeks months year ongoing" required="yes"/>
    <AttributeType name="event-frequency" dt:type="enumeration"
        dt:values="hours daily weekly monthly once" required="yes"/>
    <attribute type="activity-name"/>
    <attribute type="activity-duration"/>
    <attribute type="event-frequency"/>
    <element type="activity-payload-schema" minOccurs="0" maxOccurs="1"/>
    <element type="activity-xsl-default"/>
    <element type="activity-xsl-endpoint" minOccurs="0" maxOccurs="*"/>
    <element type="event-class" minOccurs="1" maxOccurs="*"/>
  </ElementType>
  <ElementType name="activity-payload-schema" content="eltOnly" order="seq"/>
  <ElementType name="activity-xsl-default" content="eltOnly" order="seq"/>
  <ElementType name="activity-xsl-endpoint" content="eltOnly" order="seq">
    <AttributeType name="endpoint-type" dt:type="enumeration"
        dt:values="browser html-email text-email tiny-email fax voice-phone
        instant-message" required="yes"/>
    <attribute type="endpoint-type"/>
  </ElementType>
  <ElementType name="event-class" content="eltOnly" order="seq">
    <AttributeType name="frequency" dt:type="enumeration"
        dt:values="hourly daily weekly monthly once" default="once"/>
    <AttributeType name="sensitivity" dt:type="enumeration"
        dt:values="private normal public" default="normal"/>
    <AttributeType name="reach" dt:type="enumeration"
        dt:values="broadcast group individual" default="individual"/>
```

-continued

```
    <AttributeType name="purpose" dt:type="enumeration"
        dt:values="question information instruction" default="information"/>
    <AttributeType name="immediacy" dt:type="enumeration"
        dt:values="minutes hours days weeks months" default="days"/>
    <AttributeType name="category" dt:type="enumeration"
        dt:values="auctions banking career community credit-card education
        entertainment general health information investing miscellaneous personal
        shopping system telemetry travel" default="miscellaneous"/>
    <AttributeType name="event-name" dt:type="string" required="yes"/>
    <attribute type="frequency"/>
    <attribute type="sensitivity"/>
    <attribute type="reach"/>
    <attribute type="purpose"/>
    <attribute type="immediacy"/>
    <attribute type="category"/>
    <attribute type="event-name"/>
    <element type="event-payload-schema" minOccurs="0" maxOccurs="1"/>
    <element type="event-xsl-default"/>
    <element type="event-xsl-endpoint" minOccurs="0" maxOccurs="*"/>
  </ElementType>
  <ElementType name="event-payload-schema" content="eltOnly" order="seq"/>
  <ElementType name="event-xsl-default" content="eltOnly" order="seq"/>
  <ElementType name="event-xsl-endpoint" content="eltOnly" order="seq">
    <AttributeType name="endpoint-type" dt:type="enumeration"
        dt:values="browser html-email text-email tiny-email fax voice-phone
        instant-message" required="yes"/>
    <attribute type="endpoint-type"/>
  </ElementType>
</Schema>
Informant Stylesheet:
<?xml version="1.0"?>
<!-- informant stylesheet schema -->
<Schema name="v1-1.xdr" xmlns="urn:schemas-microsoft-com:xml-data"
    xmlns:dt="urn:schemas-microsoft-com:datatypes">
  <ElementType name="smInformantStylesheet" content="eltOnly" order="seq">
    <AttributeType name="logo-url" dt:type="string"/>
    <AttributeType name="signup-url" dt:type="string"/>
    <AttributeType name="informant-stylesheet-version" dt:type="string"
        required="yes"/>
    <AttributeType name="home-url" dt:type="string"/>
    <AttributeType name="informant-category" dt:type="enumeration"
        dt:values="auctions banking career community credit-card education
        entertainment general health information investing miscellaneous personal
        shopping system telemetry travel" required="yes"/>
    <AttributeType name="informant-description" dt:type="string" required="yes"/>
    <AttributeType name="informant-stylesheet-class" dt:type="string"
        required="yes"/>
    <AttributeType name="informant-name" dt:type="string" required="yes"/>
    <attribute type="logo-url"/>
    <attribute type="signup-url"/>
    <attribute type="informant-stylesheet-version"/>
    <attribute type="home-url"/>
    <attribute type="informant-category"/>
    <attribute type="informant-description"/>
    <attribute type="informant-stylesheet-class"/>
    <attribute type="informant-name"/>
    <element type="valid-transport-source" minOccurs="1" maxOccurs="*"/>
  </ElementType>
  <ElementType name="valid-transport-source" content="textOnly">
    <AttributeType name="transport-protocol" dt:type="enumeration"
        dt:values="smtp hap" default="smtp"/>
    <AttributeType name="transport-source" dt:type="string" required="yes"/>
    <attribute type="transport-protocol"/>
    <attribute type="transport-source"/>
  </ElementType>
</Schema>
           © 2000 Centerpost Corporation
```

As described herein, a SmartMessage 10 is an XML document sent by an Informant to a SmartMessaging account hosted by a MessageML Service Provider 18. A SmartMessage 10 carries Event content or a payload 22, such as a flight cancellation or shipment confirmation, and is associated with and updates an Activity 24, such as a Travel Itinerary or DVD order.

Meta-data, such as formatting information, is found by referencing the associated Informant Stylesheet 14 (which describes the Informant) and the associated SmartMessage Stylesheet 16 (which describes the activity 24 and event 26). The structure, elements and attributes of a SmartMessage document 10 include smXML 28, route, from, to, receipt-request, activity, activity-payload, event, and event-payload. The structure, elements and attributes are summarized in the following table.

| Element and Level | Opt | Multi | Attributes | Sample Value (underline = default) |
|---|---|---|---|---|
| | | | | smXML |
| | | | protocol-version | 1.1 (current version) |
| | | | SmartMessage-id | 123ABC456DEFfutureair.com (any globally unique ID) |
| | | | SmartMessage-date | 2000-03-17T15:10:33−6:00 |
| | | | informant-stylesheet-class | http://smartmessage.futureair.com/stylesheets/informant/ |
| | | | informant-stylesheet-version | Informant-v1-2.xml |
| | | | smartmessage-stylesheet-class | http://smartmessage.futureair.com/, http://smartmessage.messageml.org/ |
| | | | smartmessage-stylesheet-version | smartmessage-v2-3.xml |
| | | | | route |
| | | | | from |
| | | | from-address | informant@futureair.com |
| | X | | reply-protocol | http, smtp |
| | X | | reply-address | sm@futureair.com |
| To | | X | | |
| | | | to-address | customer@hotmail.com |
| | X | | to-type | to, cc, bcc |
| | X | | to-protocol | http, smtp |
| receipt-request | X | X | | |
| | X | | receipt-type | ack, nak, retry |
| | X | | receipt-event | Received, processed, delivery-status |
| | X | | receipt-protocol | http, smtp |
| | | | receipt-address | receipts@futureair.com |
| | | | | activity |
| | | | activity-class | Traveliteinerary, Order, BillingCycle, |
| | | | activity-id | (an ID to uniquely identify the activity instance) |
| | | | activity-url | http://www.futureair.com/flightitnerary.cgi?id=6576782345 |
| | | | activity-title | March 29 Travel Itinerary |
| | | | activity-status | Flight reservations confirmed |
| | | | closed-date | (date activity was closed, blank if open, can be postdated) |
| Activity-payload | X | | | (a well formed XML document w/a single root) |
| | | | | Event |
| | | | event-class | FlightCancellation, Shipment, PaymentReceived |
| | | | event-id | (uniqueID to define event in corresponding activity) |
| | | | event-url | http://www.futureair.com/flightstatus.cgi?flight=FA234 |
| | | | event-description | Flight FA234 has been cancelled |
| Event-payload | | | | (a well formed XML document w/a single root) |

The "smXML" element 28 is the root element of the Smart-Message document 10, and includes the following attributes.

| Attributes | Purpose |
|---|---|
| protocol-version | The SmartMessage protocol version. The SmartMessage XML parser uses this information to maintain version specific functionality. |
| SmartMessage-id | A globally unique ID used to identify the SmartMessage. |
| SmartMessage-date | The date and time of SmartMessage submission in ISO 8601 format. The format is YYYY-MM-DDThh:mm:ss-hh:mm (for example, 1997-07-16T19:20:30+01:00). |
| informant-stylesheet-class | The Internet location of the associated Informant Stylesheet. This is the complete URL of the website where the Informant stylesheet is stored. |

-continued

| Attributes | Purpose |
|---|---|
| | For example, "http://smartmessage.messageml.org/stylesheets/informant/". Note, the ending "/" must be present for the URL to be considered complete. |
| informant-stylesheet-version | The version of the Informant Stylesheet XML document, which contains the metadata about an Informant. This is a file located at the informant-stylesheet-class. For example, if the informant-stylesheet-class is "http://smartmessage.messageml.org/stylesheets/informant/" and the informant-stylesheet-version is "v1-0.xml", then the SmartMessage processor will resolved the complete location of the Informant stylesheet to "http://smartmessage.messageml.org/stylesheets/informant/v1-0.xml". |
| SmartMessage-stylesheet-class | The Internet location of the associated SmartMessage Stylesheet. This is the complete URL of the website where the SmartMessage stylesheet is stored. For example, "http://smartmessage.messageml.org/stylesheets/receipts/". Note, the ending "/" must be present for the URL to be considered complete. |
| SmartMessage-stylesheet-version | The version of the SmartMessage Stylesheet XML document, which contains the metadata about a SmartMessage. This is a file located at the smartmessage-stylesheet-class. For example, if the smartmessage-stylesheet-class is "http://smartmessage.messageml.org/stylesheets/receipts/" and the smartmessage-stylesheet-version is "v1-0.xml", then the SmartMessage processor will resolved the complete location of the Informant stylesheet to "http://smartmessage.messageml.org/stylesheets/receipts/v1-0.xml". |

The "route" element describes information about the SmartMessage recipients, the Informant and receipt requests. This is a container element.

The "from" element defines the sender of the SmartMessage 10 and message reply options, and includes the following attributes.

| attributes | Purpose |
|---|---|
| from-address | The Informant's address in 'name@domain' format. This address is populated by the Informant to describe. |
| reply-address (optional) | The Informant's reply address. This will be different based on the value of the reply-protocol attribute. When smtp is specified for the reply-protocol, the address is the Informant's valid SMTP e-mail account in 'name@domain' format. When http is specified for the reply-protocol, the address is a valid URL, which will receive the reply via the HTTP POST method. |
| reply-protocol (optional) | The protocol in which the reply will be sent. Valid values are http and smtp. Default value is smtp. If smtp is specified an SMTP e-mail will be sent. If http is specified the reply will be posted via the HTTP POST method to the reply-address, which must be a valid URL. |

The "to" element defines the recipients of the SmartMessage. This element occurs multiple times, once for each recipient of the SmartMessage 10, and includes the following attributes.

| attributes | Purpose |
|---|---|
| to-type (optional) | The SMTP delivery method of the message. This specifies how the message should be addressed to the Recipient when smtp is specified for the to-protocol attribute of this element. Valid values are to, cc, bcc. Default value is to. |
| to-protocol (optional) | The protocol in which the SmartMessage will be sent. Valid values are http and smtp. Default value is smtp. If smtp is specified an SMTP e-mail will be sent. If http is specified the message will be posted via the HTTP POST method to the to-address, which must be a valid URL. |
| to-address | When smtp is specified for the to-protocol, the address is the recipient's valid SmartMessage account in 'name@domain' format. This address is returned to a recipient from the MessageML Service Provider when he completes the registration process. When http is specified for the to-protocol, the address is a valid URL, which will receive the SmartMessage via the HTTP POST method. |

The "receipt-request element is optional and specifies that a receipt notification of the SmartMessage 10 be sent back to the sender or Informant. The element may be defined multiple times, once for each type of receipt request, and includes the following attributes.

| Attributes | Purpose |
|---|---|
| receipt-type (optional) | Specifies the acknowledgement type of receipt to be sent to the receipt address. The SmartMessage can send a |

-continued

| Attributes | Purpose |
|---|---|
| | success (ack), failure (nak), or retry attempt (retry) receipt notifications.<br>Valid values are ack, nak, and retry. Default value is nak. |
| receipt-event (optional) | Specifies the type of receipt to be sent to the receipt-address. The receipt-address can be notified when the SmartMessage is either received by the SmartMessage Processor, has been processed by the SmartMessage Processor, or has been delivered to the Recipient.<br>Valid values are received, processed, delivery-status. Default value is processed.<br>When delivery-status is specified the receipt-address will receive a receipt for every retry attempt (retry), as well as the final delivery outcome: ack or nak. |
| receipt-protocol (optional) | The protocol in which the receipt will be sent.<br>Valid values are http and smtp. Default value is smtp.<br>If smtp is specified an SMTP e-mail will be sent with the receipt SmartMessage attached. If http is specified the receipt SmartMessage will be posted via the HTTP POST method to the receipt-address, which must be a valid URL including web page. |
| receipt-address (optional) | When smtp is specified for the receipt-protocol, the address is a valid SMTP e-mail account in 'name@domain' format.<br>When http is specified for the receipt-protocol, the address is a valid URL, which will receive the receipt via the HTTP POST method. |

The "activity" element provides information about the activity associated with the SmartMessage 10. An activity is a categorization of events. For example, an activity may be "Travel Itinerary" with such related events as "Flight Cancellation", "Flight Arrival Time", etc., and includes the following attributes.

| Attributes | purpose |
|---|---|
| activity-class | The class name of the activity. This activity class name must be defined by the Informant and must match a valid activity class (activity-class-name attribute) in the referenced SmartMessage Stylesheet (<smXML>\smartmessage-stylesheet-version). The matching activity-class-name in the SmartMessage Stylesheet contains metadata, the XML schema and endpoint specific XSL documents about the activity and more importantly defines the valid event classes for the activity class itself. |
| activity-id | A unique ID to identify the activity instance. Successive SmartMessages received with the same activity ID will be grouped by this ID. For example, multiple event classes like "Flight Arrival Time", "Flight Cancellation", etc. can be grouped under a single activity class called "01/01/200 Travel Itinerary" by associating the event classes with that ID. |
| activity-url | An associated URL to the activity. This may simply link back to the Informants web site or may contain query strings in the URL to link back to the recipient's account page. |
| activity-title | A descriptive title of the activity. |
| activity-status | A short description of the activity status. |
| closed-date | Date the activity was closed in ISO 8601 format. This date can be post-dated. If this attribute is empty the activity is assumed to be open. |

The "activity-payload" element 20 is a well-formed XML document with a single root, embedded in the SmartMessage 10. This element contains information related to the activity. This payload's XML Schema is defined by the referenced SmartMessage Stylesheet 16, as the following examples shows.

```
<travel-itinerary xmlns="travel">
    <name>FutureAirlines Travel Itinerary<name>
    <description>Boston to Chicago with Hotel, Rental Car<description>
</travel-itinerary>
```

The "event" element provides information about the event associated with the activity specified in the activity element. An event is a specific instance of some type of SmartMessage 10 occurrence, for example a specific flight delay announcement, etc., and includes the following attributes.

| Attributes | Purpose |
|---|---|
| event-class | The class name of the event. This event name must be defined by the Informant and match a defined event class (event-class-name attribute) in the referenced SmartMessage Stylesheet (<smXML>\smartmessage-stylesheet-version). This event-class must be also match a defined activity class in the SmartMessage Stylesheet. For example an airline type Informant may define "Flight Arrival Time", "Flight Cancellation", etc. event classes under a "Travel Itinerary" activity-class.<br>The matching event-class-name in the SmartMessage Stylesheet contains metadata, the XML schema and endpoint specific XSL documents about the event.<br>The event-payload will contain the information specific to the SmartMessage's instance of the event. |
| event-id | A unique ID to define the event in the corresponding activity. If another SmartMessage is sent with the same event ID then that SmartMessage will overwrite the existing instance. |
| event-url | An associated URL to the event. This may simply link back to the Informants web site or may contain query strings in the URL to provide more functionality. |
| event-description | A textual description of the event. |

The "event-payload" 22 is a well-formed XML document with a single root containing information related to the event. This payload element's XML Schema is defined by the referenced SmartMessage Stylesheet 16, as the following example shows.

```
<flightcancel xmlns="flightcancel">
    <name>John Smith</name>
    <airline>FutureAirlines</airline>
    <destname>Atlanta, GA</destname>
    <destcode>ATL</destcode>
    <departname>Chicago, IL</departname>
    <departcode>ORD</departcode>
    <departtime>7:30pm</departtime>
    <departdate>6/29/2000</departdate>
    <flightnum>219</flightnum>
    <newflight>999</newflight>
    <newtime>11:50pm</newtime>
    <newdate>6/29/2000</newdate>
    <reason>Cancellation due to bad weather.</reason>
    <customerservice>800-555-5555</customerservice>
</flightcancel>
```

As described herein, the Informant stylesheet 14 describes the meta-data about the Informant, such as logo and description, and valid transport sources. The Informant stylesheet 14 resides on one of the Informant's web servers. A MessageML Processing Platform hosted by a MessageML Service Provider 18 caches these style sheets in its own database so it can refer to them quickly without incurring another roundtrip over the Internet.

The structure, elements, and attributes of an Informant Stylesheet 14 document are summarized in the following table.

| Element | Opt | Multi | Attributes | Sample Value (underline = default) |
|---|---|---|---|---|
| | | | SmInformantStylesheet | |
| | | | informant-name | FutureAir |
| | | | informant-stylesheet-class | http://sm.futureair.com |
| | | | informant-stylesheet-version | Informant-v1-2.xml |
| | | | informant-description | Amazon.com, earth's largest store, featuring over . . . |
| | | | logo-url | http://sm.amazon.com/Logo-v2-3.jpg (should be 50 × 30 pixels) |
| | | | home-url | http://www.amazon.com/ |
| | | | signup-url | http://www.amazon.com/sm-signup.asp |
| | | | informant-category | auctions, banking, career, community, credit-card, education, entertainment, general, health, information, investing, miscellaneous, personal, shopping, system, telemetry, travel |
| valid-transport-source | | X | | |
| | | | transport-protocol | smtp, http |
| | | | transport-source | *@amazon.com, 38.240.27.*, (wildcard * allowed) |

The "smInformantStylesheet" element is the root element of this document, and includes the following attributes.

| Attributes | Purposes |
|---|---|
| informant-name | The name of the Informant. |
| informant-stylesheet-class | The Internet location of the Informant Stylesheet. This is the complete URL of the web site where the Informant stylesheet is stored. For example, "http://smartmessage.messageml.org/stylesheets/informant/". Note, the ending "/" must be present for the URL to be considered complete. This attribute describes where the document is located on the Internet itself. |
| informant-stylesheet-version | The version of the Informant Stylesheet XML document. This is an XML file located at the informant-stylesheet-class. For example, if the informant-stylesheet-class is "http://smartmessage.messageml.org/stylesheets/informant/" and the informant-stylesheet-version is "v1-0.xml", then the SmartMessage processor will resolved the complete location of the Informant stylesheet to "http://smartmessage.messageml.org/stylesheets/informant/v1-0.xml" |
| informant-description | Description of the Informant. Possibly the informant's branded slogan, etc. |
| Logo-url | Informant's logo in JPG formant - should be 50 × 30 pixels in dimension - specified in a URL format. |
| Home-url | The URL of the home page of the Informant. |
| signup-url | A URL which provides a signup or user registration |
| informant-category | The category in which the informant belongs. Valid values are: auctions, banking, career, community, credit-card, education, entertainment, general, health, information, investing, miscellaneous, personal, shopping, system, telemetry, travel |

The "valid-transport-source" element describes the valid sources from where SmartMessages 10 can originate for the specified Informant. An Informant can create different version of its Informant Stylesheet 14 to define different sets of valid transport sources. The element can occur multiple times, once for each valid transport, and includes the following attributes.

| attributes | Purpose |
| --- | --- |
| transport-protocol | The protocol the Informant can send the SmartMessage from the source defined in the transport-source attribute. Valid values are http and smtp. Default value is smtp. If smtp is specified a SmartMessage can only be received by the specified transport-source in the form of name@domain. If http is specified a SmartMessage can only be received by the specified transport-source in the form of a valid IP address. |
| transport-source | Describes the valid sources for the associated transport-protocol. By associating itself with an Informant Stylesheet (<smXML>/informant-stylesheet-version) a SmartMessage can restrict its transport sources to a small, defined set of locations to prevent unauthorized submissions. For a transport-protocol of smtp, the format name@domain is used. The transport-source can be entered with a wildcard mask using an asterisk. For example, by specifying the source *@messageml.org and protocol of smtp all user's with a domain name of messageml.org in their SMTP e-mail account will be considered valid transport sources. For a transport-protocol of http, the format is a valid IP address. An * can be used as a wildcard for any octet within the IP address. For example, by specifying the source 123.456.789.* and protocol of http all user's whose first three octets match 123.456.789 will be considered valid transport sources. |

An example of a Informant Stylesheet 14, which describes an Informant with multiple valid transport sources is as follows.

```
<smInformantStylesheet
    xmlns="x-
  schema:http://sm.futureairlines.com/schemas/def/
  smInformantStylesheetSchema1.1.xdr"
    informant-name="FutureAirlines"
    informant-stylesheet-class=http://www.futureairlines.com/definitions/
    informant-stylesheet-version="faInformantStylesheet.xml"
    informant-description="FutureAirlines - The way you should fly"
    logo-url="http://www.futureairlines.com/futureairlines.jpg"
    home-url="http://www.futureairlines.com"
    informant-category="travel">
    <valid-transport-source transport-source="*@futureairlines.com"/>
    <valid-transport-source transport-source="*@travelocity.com"/>
    <valid-transport-source transport-protocol="http" transport-source="123.456.789.*"/>
    <valid-transport-source transport-protocol="http" transport-source="321.654.*.*"/>
</smInformantStylesheet>
```

As described herein, a SmartMessage stylesheet 16 describes the meta-data about a SmartMessage 10, such as how to format it on different types of endpoints 12. The SmartMessage stylesheet 16 generally resides on one of the Informant's web servers, but Informants can also share a common stylesheet on a shared server like smartmessage.messageml.org.

A MessageML Processing Platform should cache these stylesheets in its own database so it can refer to them quickly without hitting the Internet. A single SmartMessage Stylesheet XML document 16 can contain meta-data about several SmartMessage activities 24 and events 26.

The structure, elements, and attributes of a SmartMessage Stylesheet document 16 are summarized in the following table.

| Element | Opt | Multi | Attributes | Sample Value (underline=default) |
| --- | --- | --- | --- | --- |
| smSmartMessageStylesheet | | | | |
| | | | smartmessage-stylesheet-class | http://sm.amazon.com/, http://smartmessage.messageml.org/ |
| | | | smartmessage-stylesheet-version | SmartMessage-v2-3.xml |
| Activity-class | | X | | |
| | | | activity-name | Order, BillingCycle, TravelItinerary |
| | | | activity-duration | hours, days, weeks, months, years, ongoing |
| | | | activity-frequency | hourly, daily, weekly, monthly, once |
| activity-payload-schema | X | | | (a well formed XML Schema document w/a single root - embedded) |
| activity-xsl-default | | | | (a well formed XSL document w/a single root - embedded) |
| activity-xsl-endpoint | X | X | | (a well formed XSL document w/a single root - embedded) |
| | | | endpoint-type | browser, html-email, text-email, tiny-email, fax, voice-phone, instant-message |
| event-class | | X | | |
| | | | event-name | Shipment, PaymentReceived, FlightCancellation |
| | | | Purpose | question, information, instruction |
| | | | Sensitivity | private, normal, public |
| | | | Reach | individual, group, broadcast |
| | | | Immediacy | minutes, hours, days, weeks, months |
| | | | Frequency | hourly, daily, weekly, monthly, once |
| | | | category | auctions, banking, career, community, |

-continued

| Element | Opt | Multi | Attributes | Sample Value (underline=default) |
|---|---|---|---|---|
| event-payload-schema | X | | | credit-card, education, entertainment, general, health, information, investing, miscellaneous, personal, shopping, systems, telemetry, travel (a well formed XML Schema document w/a single root - embedded) |
| event-xsl-default | | | | (a well formed XSL document w/a single root - embedded) |
| event-xsl-endpoint | X | X | | (a well formed XSL document w/a single root - embedded) |
| | | | endpoint-type | browser, html-email, text-email, tiny-email, fax, voice-phone, instant-message |

The "smSmartMessageStylesheet" is the root element of this document, and includes the following elements.

| Attributes | Purpose |
|---|---|
| smartmessage-stylesheet-class | The Internet location of the SmartMessage Stylesheet. This is the complete URL of the website where the SmartMessage Stylesheet is stored. For example, "http://smartmessage.messageml.org/stylesheets/receipts/". Note, the ending "/" must be present for the URL to be considered complete. This attribute describes where the document is located on the Internet. |
| smartmessage-stylesheet-version | The version of the SmartMessage Stylesheet XML document. This is an XML file located at the smartmessage-stylesheet-class. For example, if the smartmessage-stylesheet-class is "http://smartmessage.messageml.org/stylesheets/receipts/" and the smartmessage-stylesheet-version is "v1-0.xml", then the SmartMessage processor will resolve the complete location of the Informant stylesheet to "http://smartmessage.messageml.org/stylesheets/receipts/v1-0.xml" This attribute describes where the document is located on the Internet. |

The "activity-class" element 24 is a predefined category used to group event classes 26. The activity class 24 is defined by the Informant for use in its own SmartMessages 10, and includes the following attributes.

| Attributes | Purpose |
|---|---|
| activity-class-name | The name of the activity class. The activity-class attribute of the <activity> element in the SmartMessage must refers to a defined activity class in this document (see SmartMessage Definition section). |
| activity-duration | Describes the activities duration or life. Valid values are hours, days, weeks, months, years, ongoing |
| event-frequency | Describes how frequently events may occur within this activity. Valid values are hourly, daily, weekly, monthly, once |

The "activity-payload-schema" is a well-formed XML schema document with a single root embedded within the document. This embedded XML Schema defines the structure for activity payload 20.

The "activity-xsl-default" is a well-formed XSL document with a single root embedded within the document. This embedded XSL document transforms the activity payload 20 (XML data) into an endpoint-independent presentation format. This definition is meant to be a "catch all" for rendering activity payload to an endpoint 12, if an endpoint specific XSL document 30 is not defined. Thus, the XSL transformation must be generic enough to be viewed on any endpoint.

<Activity-xsl-Endpoint>

The "activity-xsl-endpoint" is a well-formed XSL document with a single root embedded within the document, and contains the following attribute. This embedded XSL transforms the activity payload 20 (XML data) into an endpoint-dependent presentation format. The Informant can define this element for each supported endpoint device type 12. If an XSL is not defined for a valid endpoint device, then the activity-xsl-default will be used.

| attributes | Purpose |
|---|---|
| endpoint-type | Describes the endpoint type that the embedded XSL document transforms to. An Informant can create a separate XSL for a specific endpoint device to generate the appropriate endpoint user interface. Valid values are browser, html-email, text-email, tiny-email, fax, voice-phone, instant-message |

The "event-class" element 26 defines a classification of specific events related to an activity. For example, "Flight Cancellation" may be an event class 26 defined under the activity class 24 "Travel Itinerary," and includes the following attributes.

| Attributes | Purpose |
|---|---|
| event-class-name | The name of the event class. The event-class attribute of the <event> element in the SmartMessage would refer to a defined event class in this document (see SmartMessage Definition section). |
| Purpose | Describes the purpose of the content with which the event is associated. Valid values are question, information, instruction. Default value is information.. |
| sensitivity | Describes the sensitivity with which the event is associated. Valid values are private, normal, public. Default value is normal. |

-continued

| Attributes | Purpose |
| --- | --- |
| reach | Indicates whether the document was sent to a large public broadcast, to a specific group of individuals or to one individual.<br>Valid values are individual, group, broadcast. Default value is individual. |
| immediacy | Sets the immediacy of the communication of this document payload. Dictates a measurement of how time sensitive is the document information. Information that is relatively 'old' after a few minutes should be set as 'minutes' immediacy (such as a traffic report) while information that is relative for a longer period of time is set to a higher value (such as a bill statement would be days or weeks).<br>Valid values are minutes, hours, days, weeks, months. Default value is days. |
| frequency | Valid values are hourly, daily, weekly, monthly, once. Default value is once. |

The "event-payload-schema" is a well-formed XML schema document with a single root embedded within the document. This embedded XML schema defines the structure for event content.

The "event-xsl-default" is a well-formed XSL document with a single root embedded within the document. This embedded XSL document transforms the event payload (XML data) into an endpoint-independent presentation format. This definition is meant to be a "catch all" for rendering the event payload to an endpoint, if an endpoint specific XSL document is not defined. Thus, the XSL transformation must be generic enough to be viewed on any endpoint.

The "event-xsl-endpoint" is a well-formed XSL document with a single root embedded within the document, and includes the following attributes. This embedded XSL document transforms the event payload 22 (XML data) into an endpoint-dependent presentation format. The Informant can define this element for each supported endpoint device type 12. If an XSL is not defined for a valid endpoint device 12, then the event-xsl-default will be used.

| attributes | Purpose |
| --- | --- |
| endpoint-type | Describes the endpoint type that the embedded XSL document transforms to. An Informant can create a separate XSL for each endpoint device to generate the appropriate endpoint user interface.<br>Valid values are browser, html-email, text-email, tiny-email, fax, voice-phone, instant-message |

Figure 7:
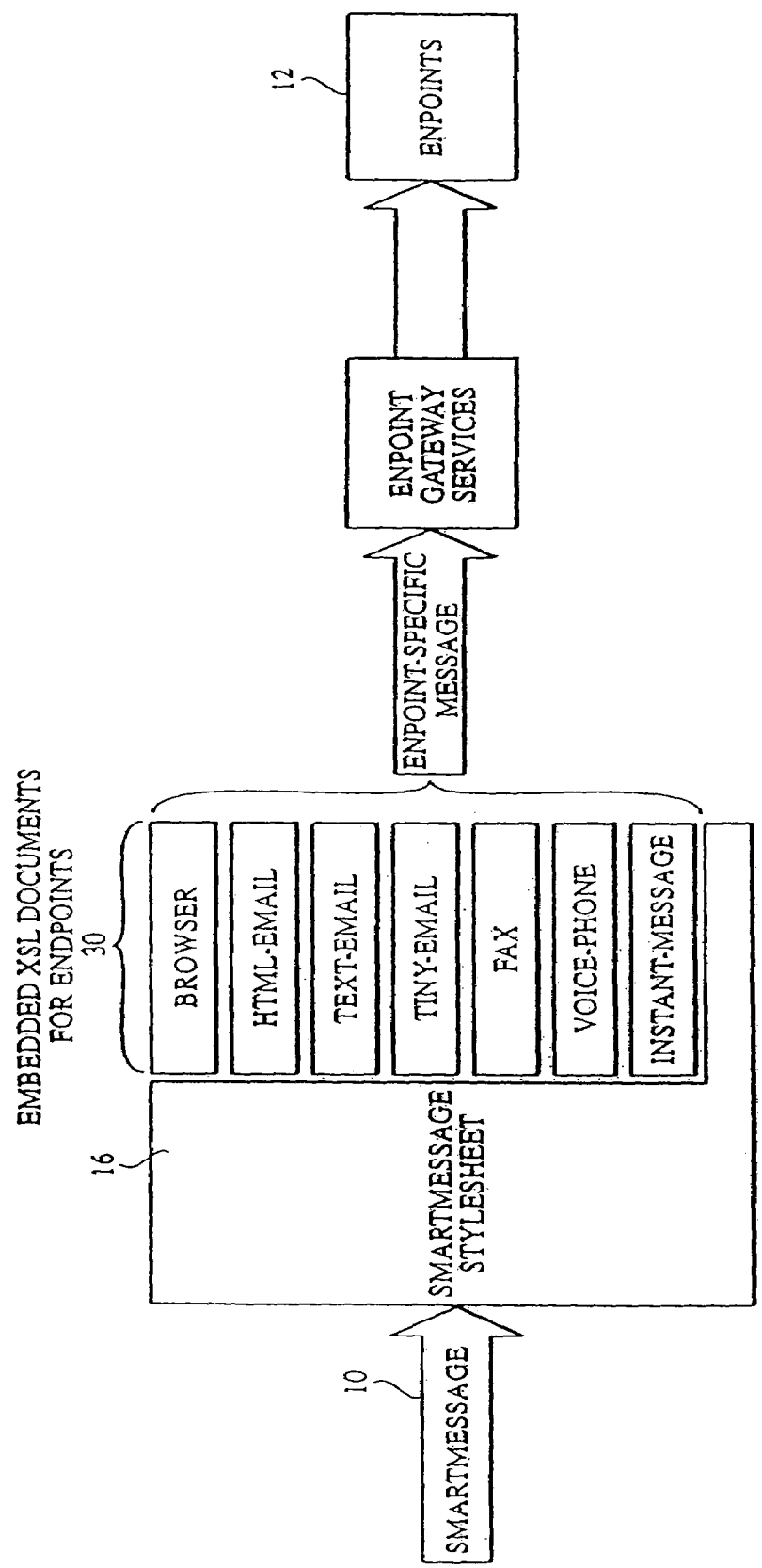
FIG. 7 is a block diagram illustrating the formatting and routing concept of the present invention.

As described herein, SmartMessages 10 are transmitted to particular endpoints 12. XSL templates define how a SmartMessage 10 is rendered to a specific endpoint 12. The <activity-xsl-endpoint> and <event-xsl-endpoint> elements contain these XSL templates, which are embedded within the SmartMessage Stylesheet 16. A XSL template should be created for each endpoint device 12. The <activity-xsl-default> and <event-xsl-default> XSL templates are required and are used to render the SmartMessage content when an endpoint specific XSL template is not defined. FIG. 7 illustrates how XSL templates are embedded in the SmartMessage Stylesheet.

Since MessageML Stylesheets reside on the Informant's web server they will be retrieved at runtime for message processing. The MessageML Processor can optimize this operation by caching these Stylesheets once the first instance of a SmartMessage referring to the Stylesheets is sent. The Service Provider 18 can then present its users with this catalog of activities and events from which they can select prioritization and routing preferences.

SmartMessage documents 10 are validated against XML Schemas as defined above. Specifically, SmartMessage documents 10 make use of Microsoft's implementation of XML Schemas (http://msdn.microsoft.com/xml/reference/schema/start.asp).

MessageML's implemented XML schemas are stored on the MessageML Forum's website and define a versioned standard of the SmartMessage specification. For example, the XML schema defined for a SmartMessage Document is located at http://smartmessage.messageml.org/schemas/smartmessage/v1-1.xdr; the XML schema defined for a SmartMessage Stylesheet is located at http://smartmessage.messageml.org/schemas/stylesheets/smartmessage/v1-1.xdr; and the XML schema defined for a Informant Stylesheet is located at http://smaitmessage.messageml.org/schemas/stylesheets/informant/v1-1.xdr These XML schemas defined for MessageML should be referenced accordingly in the related SmartMessage documents in the XML namespace attribute. For example, <smSmartMessageStylesheet
   xmlns="x-schema:http://smartmessage.messageml.org/schemas/stylesheets/smartmessage/v1-1.xdr"
. . .

<smInformantStylesheet
   xmlns="x-schema: http://smartmessage.messageml.org/schemas/stylesheets/informant/v1-1.xdr"
. . .

<smXML
   xmlns="x-schema: http://smartmessage.messageml.org/schemas/smartmessage/v1-1.xdr"
. . .

Versioning is maintained at all levels of the SmartMessage architecture, including the protocol, XML schemas and SmartMessage documents 10. Documents are versioned through their file naming convention and their location or path, which describes its purpose. The term "Class" can be thought of as the path and the term "Version" can be thought of as the filename.

Examples of MessageML defined XML schemas include the SmartMessage Stylesheet XML schema, version v1-1.xdr, class http://smartmessage.messageml.org/schemas/stylesheets/smartmessage/; the Informant Stylesheet XML schema, version v1-1.xdr, class http://smartmessage.messageml.org/schemas/stylesheets/informant; the SmartMessage XML schema, version v1-1.xdr, class http://smartmessage.messageml.org/schemas/smartmessage/

Examples of MessageML XML documents include the Informant Stylesheet version v1-0.xml, class http://smartmessage.messageml.org/stylesheets/informant/, and the Receipts SmartMessage Stylesheet, version v1-0.xml, class http://smartmessage.messageml.org/stylesheets/receipts/.

The SmartMessage protocol version is also specified on the SmartMessage document 10 in the protocol-version attribute of the MessageML element. The current version is 1.1.

It is important to note that the SmartMessage Stylesheet 16 embeds several documents into a single document. This is done so that a set of documents can be easily versioned in their entirety. If, for example, these embedded documents were allowed to be referenced externally, then a change to one of the external documents would corrupt the versioning across the entire set. Thus, by consolidating the set of related document for a SmartMessage Stylesheet 16 into one, better version control is attained.

The users of a Service Provider implementing services based on MessageML sign up to receive SmartMessages from the Informant. Each user decides where the Informant's various SmartMessage event classes are to be delivered, specifically to which of the user's endpoints. The Informant then creates and sends a SmartMessage to a set of user accounts hosted by this MessageML Service Provider. The MessageML Service Provider receives, processes and delivers the SmartMessage to the specified endpoint of each addressed user.

Figure 8:
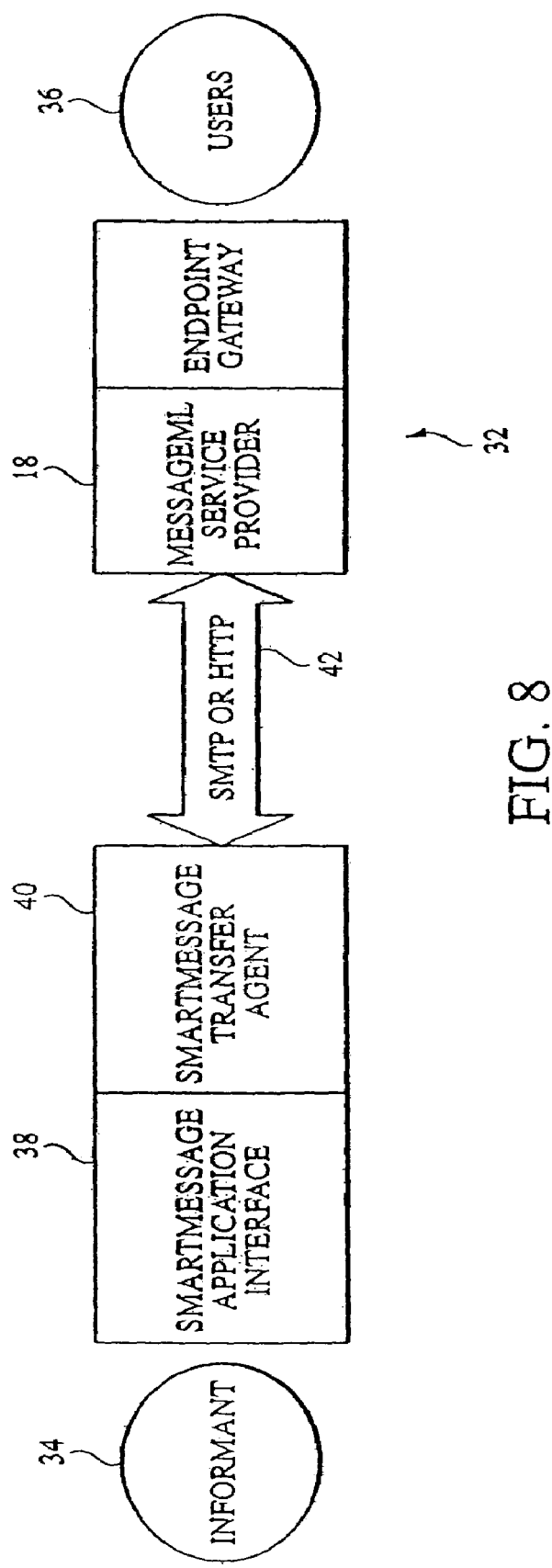
FIG. 8 is a block diagram illustrating a high-level perspective of the entities involved in the SmartMessage architecture of the present invention.

FIG. 8 illustrates a high-level perspective of the entities involved in the SmartMessage architecture 32. The Informant 34 creates the SmartMessage 10 from data on an information system. Informants 34 also create and host a set of SmartMessage Stylesheets 16 and Informant Stylesheets 14. The User 36 receives SmartMessages 10 through their SmartMessage account with a MessageML Service Provider 18. The SmartMessage Application Interface 38 provides an interface, either graphical or programmatic, to the SmartMessage Transfer Agent (SMTA) 40. This SmartMessage Application Interface can be thought of as the user application and the SMTA as the reusable code object.

The SmartMessage Transfer Agent (SMTA) 40 sends and receives SmartMessages 10 passing the message data to the SmartMessage Application. The SMTA 40 sends SmartMessages 10 through either the HTTP or SMTP Internet access protocols 42. The MessageML Service Provider (MMLSP) 18 provides the technology infrastructure and platform required to process and route SmartMessages 10 to end users or message recipients 36. This includes a web site to host the URL for HTTP access, mail servers for SMTP access, and a web application for Recipients to manage and configure their SmartMessage account.

Through a web application users register all their messaging or endpoint devices 12 on which they receive messages, like mobile phones, PDAs, pagers, fax machines, email inboxes, instant messaging, etc. The web application also serves as a message management tool providing a folio, or single repository, for a Recipient's SmartMessages 10.

The MMLSP 18 also maintains an endpoint gateway infrastructure to route SmartMessages 10 accordingly. By implementing a rules based processing module 44, SmartMessages 10 can be routed based on user preferences.

MessageML documents are transmitted to a MessageML Service Provider 18 over the Internet using the HTTP and SMTP protocols 42. By using these protocols 42, the MessageML system is able to utilize a wide base of already existing infrastructure for message communications.

Figure 9:
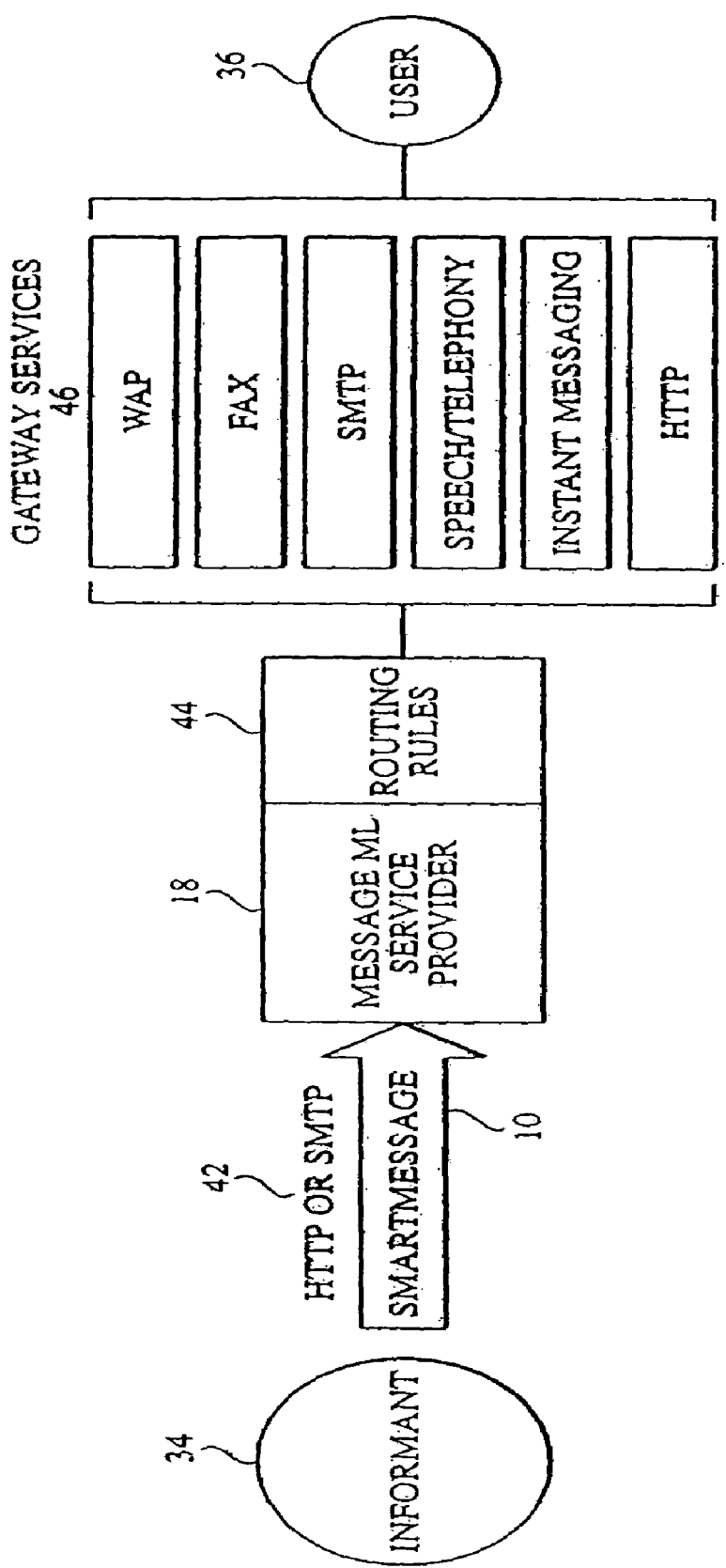
FIG. 9 is a block diagram illustrating the interrelationship between the different entities of the present invention.

Once processed, the MessageML Service Provider 18 delivers the message to the recipient via its endpoint gateway services 46, which may use voice, fax, paging, SMTP, HTTP, or other protocols. FIG. 9 illustrates the interactions between the different MessageML 32 entities.

Using the HTTP POST method, an Informant can post a MessageML document 10 to a web server (page) hosted by a MessageML Service Provider 18 who in turn will process the message and route it to the specified recipients 36. Secure communications are accomplished via Secure Sockets Layer (SSL).

An Informant 34 can also send a MessageML document 10 as a SMTP email attachment to a specific SmartMessage account on a mail server hosted by a MessageML Service Provider 18. The Service Provider 18 will process the attached MessageML document and route it to the specified recipients 36. Secure communications are accomplished via S/MIME.

The MessageML architecture 32 handles secure messaging in three ways. The Informant 34 via the SmartMessage Transfer Agent 40 and MessageML Service Provider 18 must support the following authentication and security methods: Informant Stylesheet Authentication, Secure Sockets Layer (SSL), and S/MIME.

With Informant Stylesheet Authentication, the SmartMessage references a specific Informant Stylesheet 14, which contains a list of valid transport sources from which a SmartMessage 10 can be sent. An Informant 34 may have many Informant Stylesheets 14 with different combinations of valid transport sources to be used with different classes of SmartMessages 10.

Using Secure Sockets Layer encryption, SmartMessages can be sent via HTTP to guarantee secure transmission. When posting data to a web page the URL should use SSL. For example, https:// . . . would be used instead of http:// . . .

SmartMessages 10 can also be sent as attachments to SMTP mail, using S/MIME to add cryptographic security services to mail that is sent, and to interpret cryptographic security services in mail that is received. S/MIME needs to be enabled by the sender and supported by the receiver of the mail transaction.

In addition to maintaining versioned XML schemas of standard MessageML documents 10, MessageML.org also manages specific categories of "standard" SmartMessages 10. These include areas such as receipts, query operations, configuration, web messages, and public communications.

Since MessageML.org is the single Informant 34 for these types of standard messages, these standard SmartMessages 10 always refer to MessageML.org's Informant Stylesheet 14 (the informant-stylesheet-class and informant-stylesheet-version attributes). The following lists the Informant Stylesheet 14 for MessageML.org.

```
<smInformantStylesheet
    xmlns="x-
schema:http://smartmessage.messageml.org/schemas/stylesheets/informant/
v1-1.xdr"
    informant-name="MessageML.org"
    informant-stylesheet-
class="http://smartmessage.messageml.org/stylesheets/informant/"
    informant-stylesheet-version="v1-0.xml"
    informant-description="MessageML.org"
    logo-url="http://smartmessage.messageml.org/informants/logo.jpg"
    home-url="http://smartmessage.messageml.org"
    informant-category="miscellaneous">
  <valid-transport-source transport-protocol="smtp" transport-
source="*"/>
  <valid-transport-source transport-protocol="http" transport-
source="*"/>
</smInformantStylesheet>
<smInformantStylesheet
    xmlns="x-
schema:http://smartmessage.messageml.org/schemas/stylesheets/informant/
v1-1.xdr"
    informant-name="MessageML.org"
    informant-stylesheet-
class="http://smartmessage.messageml.org/stylesheets/informant/"
    informant-stylesheet-version="v1-0.xml"
    informant-description="MessageML.org"
    logo-url="http://smartmessage.messageml.org/informants/logo.jpg"
    home-url="http://smartmessage.messageml.org"
    informant-category="miscellaneous">
  <valid-transport-source transport-protocol="smtp" transport-
source="*"/>
  <valid-transport-source transport-protocol="http" transport-
```

-continued

```
      source="*"/>
</smInformantStylesheet>
<smInformantStylesheet
      xmlns="x-
schema:http://smartmessage.messageml.org/schemas/stylesheets/informant/
v1-1.xdr"
      informant-name="MessageML.org"
      informant-stylesheet-
class="http://smartmessage.messageml.org/stylesheets/informant/"
      informant-stylesheet-version="v1-0.xml"
      informant-description="MessageML.org"
      logo-url="http://smartmessage.messageml.org/informants/logo.jpg"
      home-url="http://smartmessage.messageml.org"
      informant-category="miscellaneous">
   <valid-transport-source transport-protocol="smtp" transport-
source="*"/>
   <valid-transport-source transport-protocol="http" transport-
source="*"/>
</smInformantStylesheet>
```

Specifications for these additional standard SmartMessage types 10 can be found at www.MessageML.org. The publishing location and naming convention is as follows.

[informant website url]/stylesheets/[activity]/v[major version]-[minor version].xml where:
[informant website url] is the URL of the Internet host
[activity] is the activity class that the stylesheet defines
[major version] number for major version number
[minor version] number for minor version number
    example: http://www.futureairlines.com/stylesheets/travel-itinerary/v1-0.xml In this scenario the smartmessage-stylesheet-class would be http://www.futureairlines.com/stylesheets/travel-itinerary/ and the smartmessage-stylesheet-version would be v1-0.xml.

Informant Stylesheets 14 follow a similar publishing location and name convention.

[informant website url]/stylesheets/informant/v[major version]-[minor version].xml where:
[informant website url] is the URL of the Internet host
[major version] number for major version number
[minor version] number for minor version number
    example: http://www.futureairlines.com/stylesheets/informant/v1-0.xml In this scenario the informant-stylesheet-class would be http://www.futureairlines.com/stylesheets/informant/ and the informant-stylesheet-version would be v1-0.xml.

Figure 10:
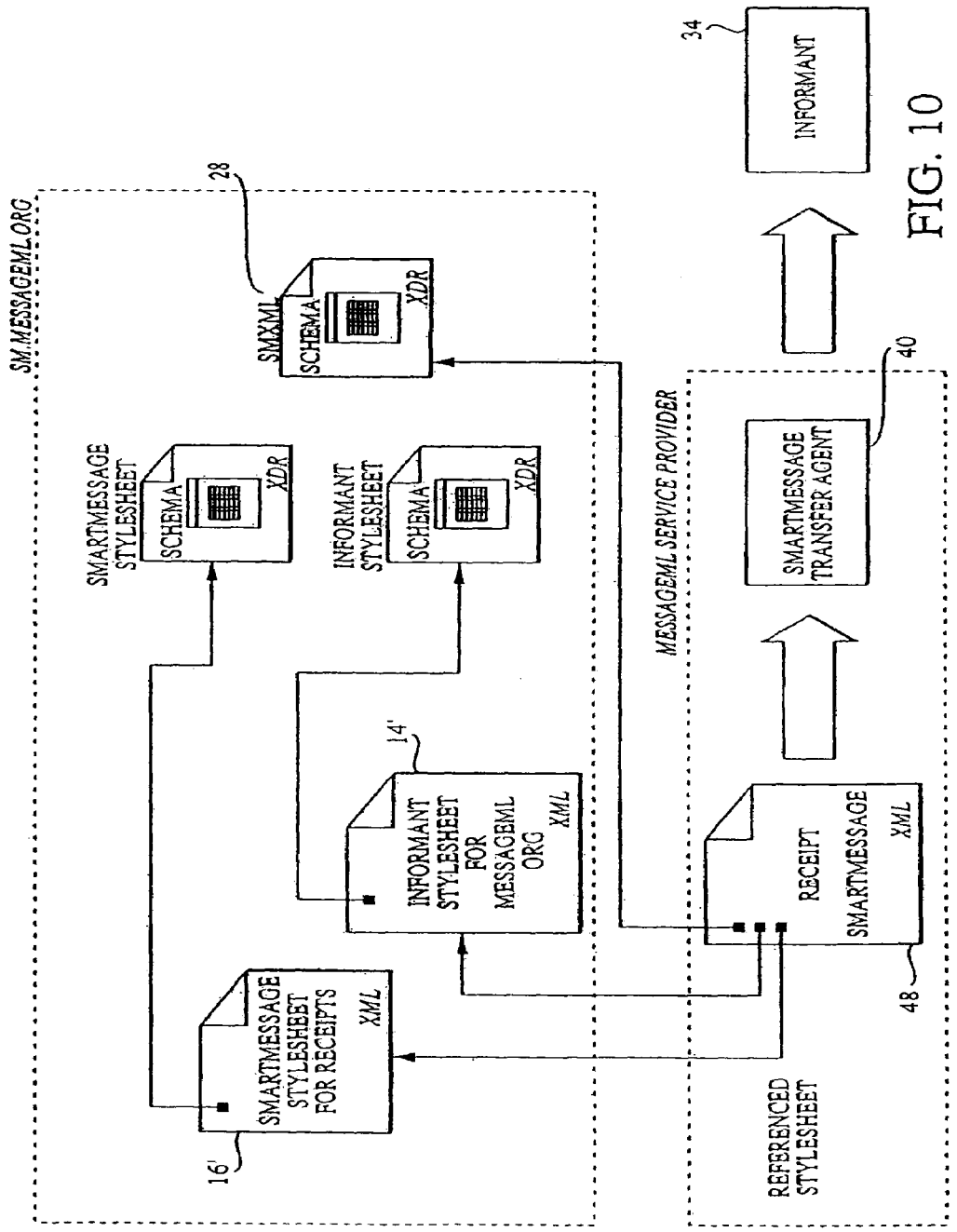
FIG. 10 is a block diagram illustrating the interrelationship between the elements of the SmartMessage of the present invention, including the receipt function.

As shown in FIG. 10, a Receipt 48 provides a status update as to the progress of a SmartMessage. The MessageML design utilizes a SmartMessage Stylesheet for receipts 16' in a similar fashion as that shown in FIG. 4 and described above. The receipt 48 is returned to the Informant 34 through the SmartMessage Transfer Agent 40. The MessageML specification supports three types of receipts 48: received, processed, and delivery status. These receipt types are requested to be sent by creating the appropriate entry or entries under the receipt-request element in the original SmartMessage.

Since receipts 48 are a standard SmartMessage type, their associated Informant Stylesheet 14' and SmartMessage Stylesheet 16' reside on the MessageML Forum website at www.messageml.org. This ensures that receipts 48 are transacted in a standard way across all implementations.

The SmartMessage 10 enters the received state when it has been received by a MessageML Service Provider (MMLSP) 18. At this point all destination SmartMessage accounts are validated against the MMLSP's account database. Destination SmartMessage accounts not matching the Service Providers domain name are skipped and not included in receipt processing. The following table describes the valid receipt acknowledgements for a received receipt.

| Type | Description |
|---|---|
| ack | The destination SmartMessage was successfully received by the MMLSP for the specified SmartMessage account. |
| nak | The destination SmartMessage was not successfully received by the MMLSP for the specified SmartMessage account. The error-code and error-description attributes and the extended-info element will contain more information. |

The SmartMessage 10 enters the processed state when it has been successfully received and is ready to be processed by the MMLSP 18 who performs all the validity checks and routing rules. The following table describes the valid receipt acknowledgements for a processed receipt.

| Type | Description |
|---|---|
| ack | The destination SmartMessage was successfully processed by the MMLSP for the specified SmartMessage account. |
| nak | The destination SmartMessage was not successfully processed by the MMLSP for the specified SmartMessage account. The error-info and the extended-info elements will contain more information. |

The SmartMessage 10 enters the delivery status state when it has been successfully processed and is ready to be delivered. A SmartMessage 10 that cannot be delivered initially enters a message retry loop and continues to be resent until the retry interval or retry time period has expired. The following table describes the valid receipt acknowledgements for a delivery-status receipt.

| Type | Description |
|---|---|
| ack | The destination SmartMessage was successfully delivered by the MMLSP for the specified SmartMessage account. |
| nak | The destination SmartMessage was not successfully delivered by the MMLSP for the specified SmartMessage account. The error-info and the extended-info elements will contain more information. |
| Retry | The SmartMessage failed to be delivered and the MMLSP is resending the message and will continue to retry sending the message until the retry interval or retry time has expired. |

Receipts 48 are delivered at a granular level. They are not grouped and relate to a single destination address receipt request.

Figure 11:
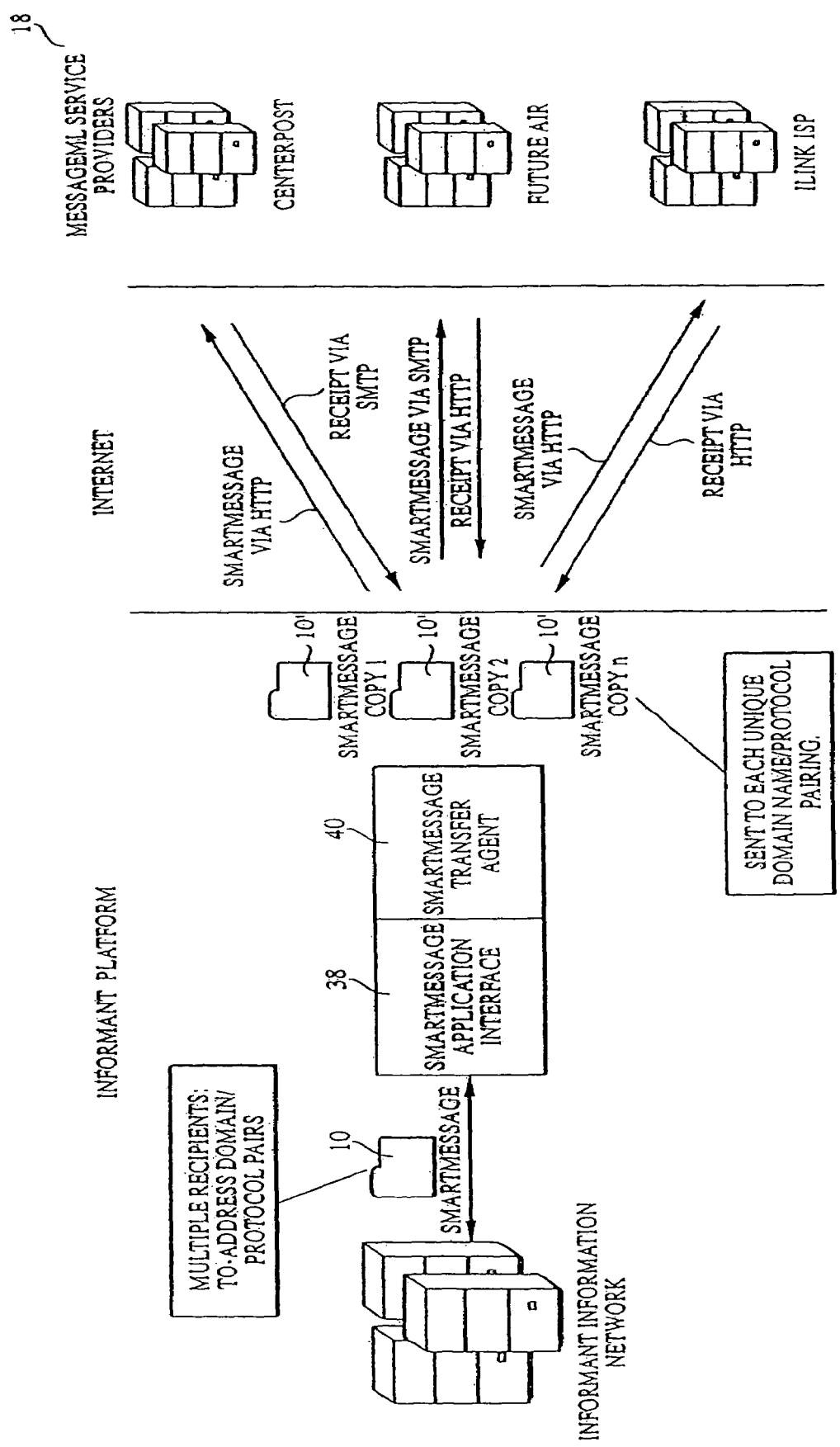
FIG. 11 is a diagram illustrating the flow of the SmartMessage of the present invention, including the receipt function.

The process flow using receipts is shown in FIG. 11, which assumes that all of the receipt types have been specified. First, an Informant creates a SmartMessage 10, specifying the desired receipt-requests, and passes it to the SmartMessage Application Interface (SMAI) 38. Then, the SmartMessage Transfer Agent (SMTA) 40 queries the SmartMessage 10 and identifies all destination domain names to where the message will be sent. Next, the SMTA 40 makes a copy of the SmartMessage 10' for each destination host and submits the message using the protocol or protocols specified in the SmartMessage 10. The SMTA 40 handles any failed SMTP or HTTP attempts to reach the "to-address" destinations. The MessageML Service Providers 18 receives the message and validates that all the "to-address" accounts are valid to the MessageML Service Provider 18. Received receipts are delivered to the Informant's SMTA 40 who processes them accordingly. If the SmartMessage 10 is received correctly, it is then processed. Processed receipts are sent to the Informant's SMTA 40 who processes them accordingly. Next, the message is delivered based on the SmartMessage user's predefined endpoint routing rules. Delivered receipts are sent to the Informant's SMTA 40 who processes them accordingly. A per user receipt item will be included for each endpoint the message was delivered.

The following tables disclose the elements and attributes for the received event payload definition, the processed event payload definition and the delivery status event payload definition, respectively.

| Received Event Payload Definition | | | | |
|---|---|---|---|---|
| Element | Opt | Multi | Attributes | Sample Value (underline=default) |
| | | | Receipt | |
| | | | receipt-event | received |
| | | | receipt-type | ack, nak |
| | | | receipt-date | ISO 8601 format (ex: 2000-03-17T15:10:33) |
| | | | smartmessage-id | (smartmessage-id from the original SmartMessage) |
| | | | to-address | user@domainname (from original SmartMessage) |
| error-info | X | | | |
| | | | error-class | http, https, smtp, smime, platform-specific |

| Received Event Payload Definition -continued | | | | |
|---|---|---|---|---|
| Element | Opt | Multi | Attributes | Sample Value (underline=default) |
| | | | error-code | (see Error Code section) |
| | | | error-description | (see Error Code section) |
| extended-info | X | | | |

| Processed Event Payload Definition | | | | |
|---|---|---|---|---|
| Element | Opt | Multi | Attributes | Sample Value (underline = default) |
| | | | Receipt | |
| | | | receipt-event | processed |
| | | | receipt-type | ack, nak |
| | | | receipt-date | ISO 8601 format (ex: 2000-03-17T15:10:33) |
| | | | SmartMessage-id | (smartmessage-id from the original SmartMessage) |
| | | | to-address | user@domainname (from original SmartMessage) |
| error-info | X | | | |
| | | | error-class | http, https, smtp, smime, platform-specific |
| | | | error-code | (see Error Code section) |
| | | | error-description | (see Error Code section) |
| extended-info | X | | | |

| Delivery Status Event Payload Definition | | | | |
|---|---|---|---|---|
| Element | Opt | Multi | Attributes | Sample Value (underline = default) |
| | | | receipt | |
| | | | receipt-event | Received |
| | | | receipt-type | ack, nak |
| | | | receipt-date | ISO 8601 format (ex: 2000-03-17T15:10:33) |
| | | | SmartMessage-id | (smartmessage-id from the original SmartMessage) |
| | | | to-address | user@domainname (from original SmartMessage) |
| | | | endpoint-type | browser, html-email, text-email, tinymail, fax, voice-phone, instant-message |
| | | | endpoint-address | endpoint specific (ex: fax number, email address, phone number, etc. |
| | | | last-attempt-date | (last delivery attempt) ISO 8601 format. |
| | | | will-retry-attempt | (number of retry attempt remaining) |
| | | | will-retry-until | (when retry attempts will stop) ISO 8601 format |
| | | | next-retry-attempt | (when the next retry attempt will occur) ISO 8601 format |
| error-info | X | | | |
| | | | error-class | http, https, smtp, smime, platform-specific |
| | | | error-code | (see Error Code section) |
| | | | error-description | (see Error Code section) |
| extended-info | X | | | |

Further, error codes, as described in the following table, are contained the error-info element of the received, processed and delivery status event payloads.

| Attribute | Values | Description |
| --- | --- | --- |
| error-class | http | HTTP/1.1 Status Code. The error codes used are defined by W3C (http://www.w3.org/Protocols/rfc2616/rfc2616-sec10.html#sec10) |
|  | https | same as above |
|  | smtp | SMTP Reply Code. The error codes users are defined by RFC 1893 (http://www.ietf.org/rfc/rfc1893.txt?number=1893) and RFC 821, section 4.2 (http://ietf.org/rfc/rfc0821.txt?number=821) |
|  | smime | S/MIME error code |
|  | platform-specific | This class is designated for implementers of the SmartMessage specification. Its can be used to denote errors specific to a platform's implementation. |
| error-code | 0 = success, non-zero value based on error-class. | Error code associated with the error-class |
| error-description |  | (textual description of error) |

An example of a Receipt SmartMessage Stylesheet for Receipts is as follows:
SmartMessageStylesheet:

```
xmlns="x-schema:http://sm.smartmessage.org/schemas/stylesheets/smartmessage/v1-1.xdr"
smartmessage-stylesheet-class="http://sm.smartmessage.org/stylesheets/receipts/"
smartmessage-stylesheet-version="v1-0.xml">
<activity-class
    activity-name="Receipts"
    activity-duration="ongoing"
    event-frequency="once">
    <activity-xsl-default>
        <xsl_default:stylesheet xmlns="http://www.w3.org/TR/REC-html40"
            xmlns:xsl_default="http://www.w3.org/TR/WD-xsl">
        <xsl_default:template match="/"/>
        </xsl_default:stylesheet>
    </activity-xsl-default>
    <event-class
      event-name="DeliveryStatus"
      purpose="information"
      sensitivity="normal"
      reach="individual"
      immediacy="days"
      frequency="daily"
      category="system">
      <event-payload-schema>
        <Schema name="deliverystatusreceipt.xdr"
          xmlns="urn:schemas-microsoft-com:xml-data"
          xmlns:dt="urn:schemas-microsoft-com:datatypes">
          <ElementType name="receipt" content="eltOnly" order="seq">
            <AttributeType name="receipt-event" dt:type="enumeration"
               dt:values="delivery-status" default="delivery-status"/>
            <AttributeType name="receipt-type" dt:type="enumeration"
               dt:values="ack nak retry" default="nak"/>
            <AttributeType name="receipt-date" dt:type="dateTime"
                required="yes"/>
            <AttributeType name="smartmessage-id" dt:type="string"
                required="yes"/>
            <AttributeType name="to-address" dt:type="string"
                required="yes"/>
            <AttributeType name="endpoint-type" dt:type="enumeration"
                dt:values="browser html-email text-email tiny-email fax
                voice-phone instant-message" required="yes"/>
            <AttributeType name="endpoint-address" dt:type="string"
                required="yes"/>
            <AttributeType name="last-attempt-date" dt:type="dateTime"
```

-continued

```
                    required="yes"/>
                <AttributeType name="will-retry-attempt" dt:type="int"
                    required="yes"/>
                <AttributeType name="will-retry-until" dt:type="dateTime"
                    required="yes"/>
                <AttributeType name="next-retry-attempt" dt:type="dateTime"
                    required="yes"/>
                <attribute type="receipt-event"/>
                <attribute type="receipt-type"/>
                <attribute type="receipt-date"/>
                <attribute type="smartmessage-id"/>
                <attribute type="to-address"/>
                <attribute type="endpoint-type"/>
                <attribute type="endpoint-address"/>
                <attribute type="last-attempt-date"/>
                <attribute type="will-retry-attempt"/>
                <attribute type="will-retry-until"/>
                <attribute type="next-retry-attempt"/>
                <element type="error-info" minOccurs="0" maxOccurs="1"/>
                <element type="extended-info" minOccurs="0" maxOccurs="1"/>
            </ElementType>
            <ElementType name="error-info" content="eltOnly" order="seq">
                <AttributeType name="error-class" dt:type="enumeration"
                    dt:values="http https smtp smime platform-specific"
                    default="smtp" required="yes"/>
                <AttributeType name="error-code" dt:type="string"
required="yes"/>
                <AttributeType name="error-description" dt:type="string"
                    required="yes"/>
                <attribute type="error-class"/>
                <attribute type="error-code"/>
                <attribute type="error-description"/>
            </ElementType>
            <ElementType name="extended-info" content="eltOnly"
order="seq"/>
        </Schema>
    </event-payload-schema>
    <event-xsl-default>
        <xsl_default:stylesheet xmlns="http://www.w3.org/TR/REC-html40"
            xmlns:xsl_default="http://www.w3.org/TR/WD-xsl">
            <xsl_default:template match="/">
                <xsl_default:apply-templates select="receipt"/>
            </xsl_default:template>
            <xsl_default:template match="receipt">
Receipt Item
  receipt-event:       <xsl_default:value-of select="@receipt-event"/>
  receipt-type:        <xsl_default:value-of select="@receipt-type"/>
  receipt-date:        <xsl_default:value-of select="@receipt-date"/>
  smartmessage-id:     <xsl_default:value-of select="@smartmessage-id"/>
  to-address:          <xsl_default:value-of select="@to-address"/>
  endpoint-type:       <xsl_default:value-of select="@endpoint-type"/>
  endpoint-address:    <xsl_default:value-of select="@endpoint-address"/>
  last-attempt-date:   <xsl_default:value-of select="@last-attempt-date"/>
  will-retry-attempt:  <xsl_default:value-of select="@will-retry-attempt"/>
  will-retry-until:    <xsl_default:value-of select="@will-retry-until"/>
  next-retry-attempt:  <xsl_default:value-of select="@next-retry-attempt"/>
  error-class:         <xsl_default:value-of select="error-info/@error-class"/>
  error-code:          <xsl_default:value-of select="error-info/@error-code"/>
  error-description:   <xsl_default:value-of select="error-info/@error-description"/>
Receipt Specific Data:
    <xsl_default:value-of select="extended-info"/>
            </xsl_default:template>
        </xsl_default:stylesheet>
    </event-xsl-default>
</event-class>
<event-class
  event-name="Received"
  purpose="information"
  sensitivity="normal"
  reach="individual"
  immediacy="days"
  frequency="once"
  category="miscellaneous">
    <event-payload-schema>
        <Schema name="receivedreceipt.xdr"
            xmlns="urn:schemas-microsoft-com:xml-data"
            xmlns:dt="urn:schemas-microsoft-com:datatypes">
            <ElementType name="receipt" content="eltOnly" order="seq">
                <AttributeType name="receipt-event" dt:type="enumeration"
```

-continued

```
            dt:values="received" default="received"/>
          <AttributeType name="receipt-type" dt:type="enumeration"
            dt:values="ack nak" default="nak"/>
          <AttributeType name="receipt-date" dt:type="dateTime"
            required="yes"/>
          <AttributeType name="smartmessage-id" dt:type="string"
            required="yes"/>
          <AttributeType name="to-address" dt:type="string"
required="yes"/>
          <AttributeType name="error-code" dt:type="string"
required="no"/>
          <AttributeType name="error-description" dt:type="string"
            required="no"/>
          <attribute type="receipt-event"/>
          <attribute type="receipt-type"/>
          <attribute type="receipt-date"/>
          <attribute type="smartmessage-id"/>
          <attribute type="to-address"/>
          <element type="error-info" minOccurs="0" maxOccurs="1"/>
          <element type="extended-info" minOccurs="0" maxOccurs="1"/>
        </ElementType>
        <ElementType name="error-info" content="eltOnly" order="seq">
          <AttributeType name="error-class" dt:type="enumeration"
            dt:values="http https smtp smime platform-specific"
            default="smtp" required="yes"/>
          <AttributeType name="error-code" dt:type="string"
required="yes"/>
          <AttributeType name="error-description" dt:type="string"
            required="yes"/>
          <attribute type="error-class"/>
          <attribute type="error-code"/>
          <attribute type="error-description"/>
        </ElementType>
        <ElementType name="extended-info" content="eltOnly"
order="seq"/>
      </Schema>
    </event-payload-schema>
    <event-xsl-default>
      <xsl_default:stylesheet xmlns="http://www.w3.org/TR/REC-html40"
        xmlns:xsl_default="http://www.w3.org/TR/WD-xsl">
        <xsl_default:template match="/">
          <xsl_default:apply-templates select="receipt"/>
        </xsl_default:template>
        <xsl_default:template match="receipt">
Receipt Item
  receipt-event:       <xsl_default:value-of select="@receipt-event"/>
  receipt-type:        <xsl_default:value-of select="@receipt-type"/>
  receipt-date:        <xsl_default:value-of select="@receipt-date"/>
  smartmessage-id:     <xsl_default:value-of select="@smartmessage-id"/>
  to-address:          <xsl_default:value-of select="@to-address"/>
  error-class:   <xsl_default:value-of select="error-info/@error-class"/>
  error-code:          <xsl_default:value-of select="error-info/@error-code"/>
  error-description:   <xsl_default:value-of select="error-info/@error-description"/>
Receipt Specific Data:
    <xsl_default:value-of select="extended-info"/>
        </xsl_default:template>
      </xsl_default:stylesheet>
    </event-xsl-default>
  </event-class>
  <event-class
    event-name="Processed"
    purpose="information"
    sensitivity="normal"
    reach="individual"
    immediacy="days"
    frequency="once"
    category="miscellaneous">
    <event-payload-schema>
      <Schema name="processedreceipt.xdr"
        xmlns="urn:schemas-microsoft-com:xml-data"
        xmlns:dt="urn:schemas-microsoft-com:datatypes">
        <ElementType name="receipt" content="eltOnly" order="seq">
          <AttributeType name="receipt-event" dt:type="enumeration"
            dt:values="processed" default="processed"/>
          <AttributeType name="receipt-type" dt:type="enumeration"
            dt:values="ack nak" default="nak"/>
          <AttributeType name="receipt-date" dt:type="dateTime"
            required="yes"/>
          <AttributeType name="smartmessage-id" dt:type="string"
```

-continued

```
                required="yes"/>
            <AttributeType name="to-address" dt:type="string"
required="yes"/>
            <AttributeType name="error-code" dt:type="string"
required="no"/>
            <AttributeType name="error-description" dt:type="string"
                required="no"/>
            <attribute type="receipt-event"/>
        <attribute type="receipt-type"/>
            <attribute type="receipt-date"/>
            <attribute type="smartmessage-id"/>
            <attribute type="to-address"/>
            <element type="error-info" minOccurs="0" maxOccurs="1"/>
            <element type="extended-info" minOccurs="0" maxOccurs="1"/>
        </ElementType>
        <ElementType name="error-info" content="eltOnly" order="seq">
            <AttributeType name="error-class" dt:type="enumeration"
                dt:values="http https smtp smime platform-specific"
                default="smtp" required="yes"/>
            <AttributeType name="error-code" dt:type="string"
required="yes"/>
            <AttributeType name="error-description" dt:type="string"
                required="yes"/>
            <attribute type="error-class"/>
            <attribute type="error-code"/>
            <attribute type="error-description"/>
        </ElementType>
        <ElementType name="extended-info" content="eltOnly"
order="seq"/>
        </Schema>
    </event-payload-schema>
    <event-xsl-default>
        <xsl_default:stylesheet xmlns="http://www.w3.org/TR/REC-html40"
            xmlns:xsl_default="http://www.w3.org/TR/WD-xsl">
            <xsl_default:template match="/">
                <xsl_default:apply-templates select="receipt"/>
            </xsl_default:template>
            <xsl_default:template match="receipt">
Receipt Item
    receipt-event:      <xsl_default:value-of select="@receipt-event"/>
    receipt-type:       <xsl_default:value-of select="@receipt-type"/>
    receipt-date:       <xsl_default:value-of select="@receipt-date"/>
    smartmessage-id:    <xsl_default:value-of select="@smartmessage-id"/>
    to-address:         <xsl_default:value-of select="@to-address"/>
    error-class:        <xsl_default:value-of select="error-info/@error-class"/>
error-code:             <xsl_default:value-of select="error-info/@error-code"/>
error-description:      <xsl_default:value-of select="error-info/@error-description"/>
Receipt Specific Data:
    <xsl_default:value-of select="extended-info"/>
            </xsl_default:template>
        </xsl_default:stylesheet>
    </event-xsl-default>
    </event-class>
</activity-class>
</smSmartMessageStylesheet>
```

© 2000 Center Corporation

Although some of MessageML's initial applications and services are targeted towards providing electronic messaging to Recipient endpoints devices 12, there is opportunity to apply the standard to a multitude of other applications, i.e., two-way messaging communication between automated processes, transformation to and from other XML formats to provide messaging interoperability with other XML technologies, communication routing applications for field service, etc.

The novel communications platform also provides for a platform subscriber web page whereby designated personal information of the individual is accessible on a secure basis; an endpoint wallet, which allows subscribers to easily transfer their endpoint information to other web pages and the like; and a message based endpoint configuration, in which a SmartMessage from a communication device automatically sets up that device as an endpoint in the user's SmartDelivery or SmartMessage account.

The novel communications platform is a highly scalable and reliable XML messaging engine capable of processing messages based on highly dynamic and openly definable logic. The platform is fully aware of each individual user's entire communications environment, such as email boxes, cell phones, pagers, fax machines, telephones, etc. as well as the devices of spouses, assistants, friends, and co-workers, whom the user may wish to receive a copy of a message depending on its specific content. The communications platform automatically processes based on the pre-defined defaults, the user's preferences regarding his electronic endpoints (email boxes, wireless devices, etc.) and the attributes of the message itself. This embedded intelligence, for example, would send travel weather alerts to the user's home fax but flight cancellations to the user's cellphone with a copy to the assistant's work fax. Users can modify the rules if they prefer to deviate from the systems defaults. With this novel communications platform, individuals only define their endpoints once in a single spot and retain a lifetime electronic address for all of their endpoints.

Figure 12:
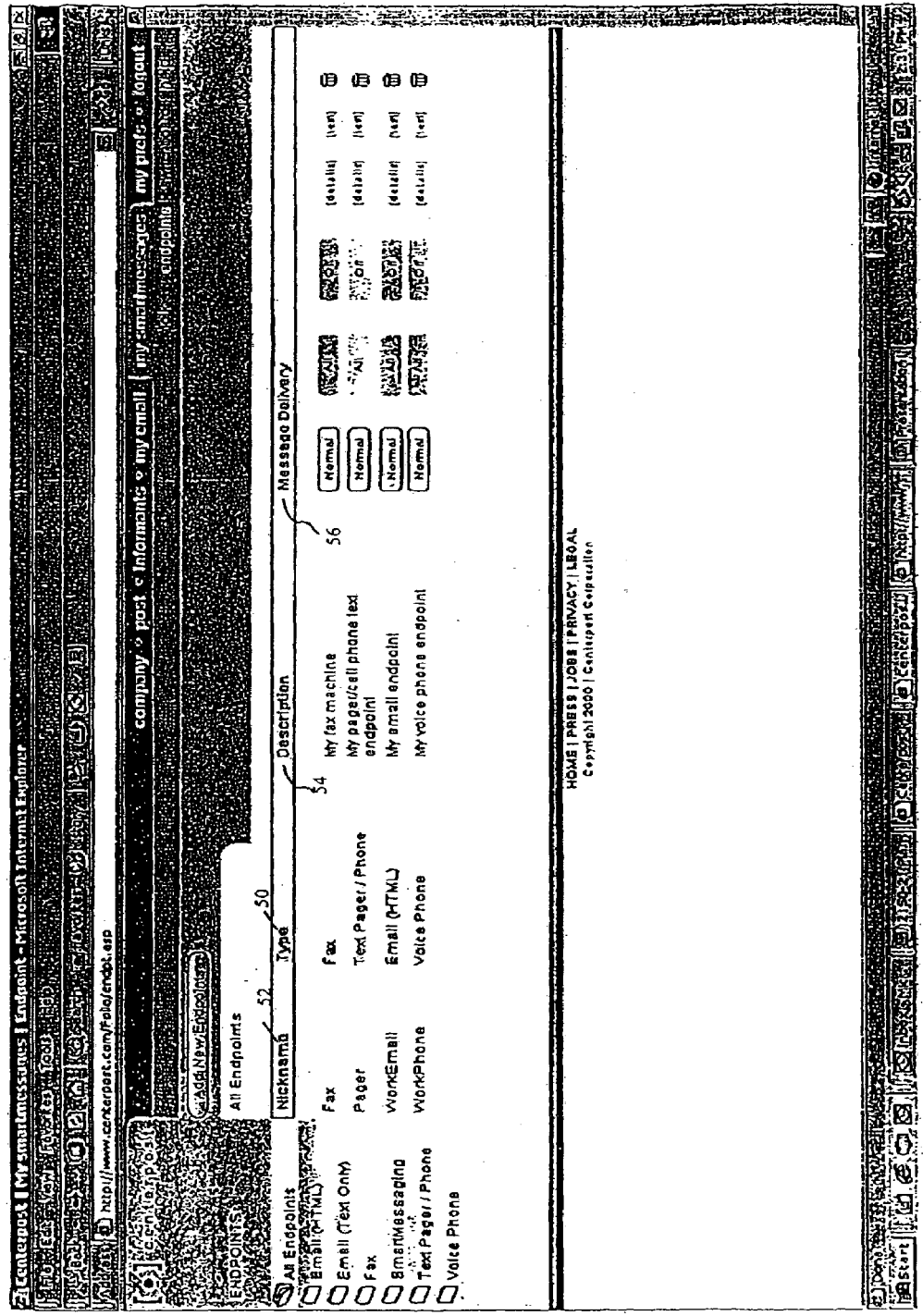
FIG. 12A is a screen print of the endpoint setup page for the Centerpost communications platform.
FIG. 12B is an example of a web page that describes the details 58 for a particular endpoint, in this case, the subscriber's HTML Email.
FIG. 12C is an example of a web page that allows the subscriber to modify certain advanced options 60 for a particular endpoint.
FIG. 12D is an example of a save endpoint web page.
FIGS. 12E and 12F show the screen prints for the Endpoint Test 64 web pages.
Figure 12:
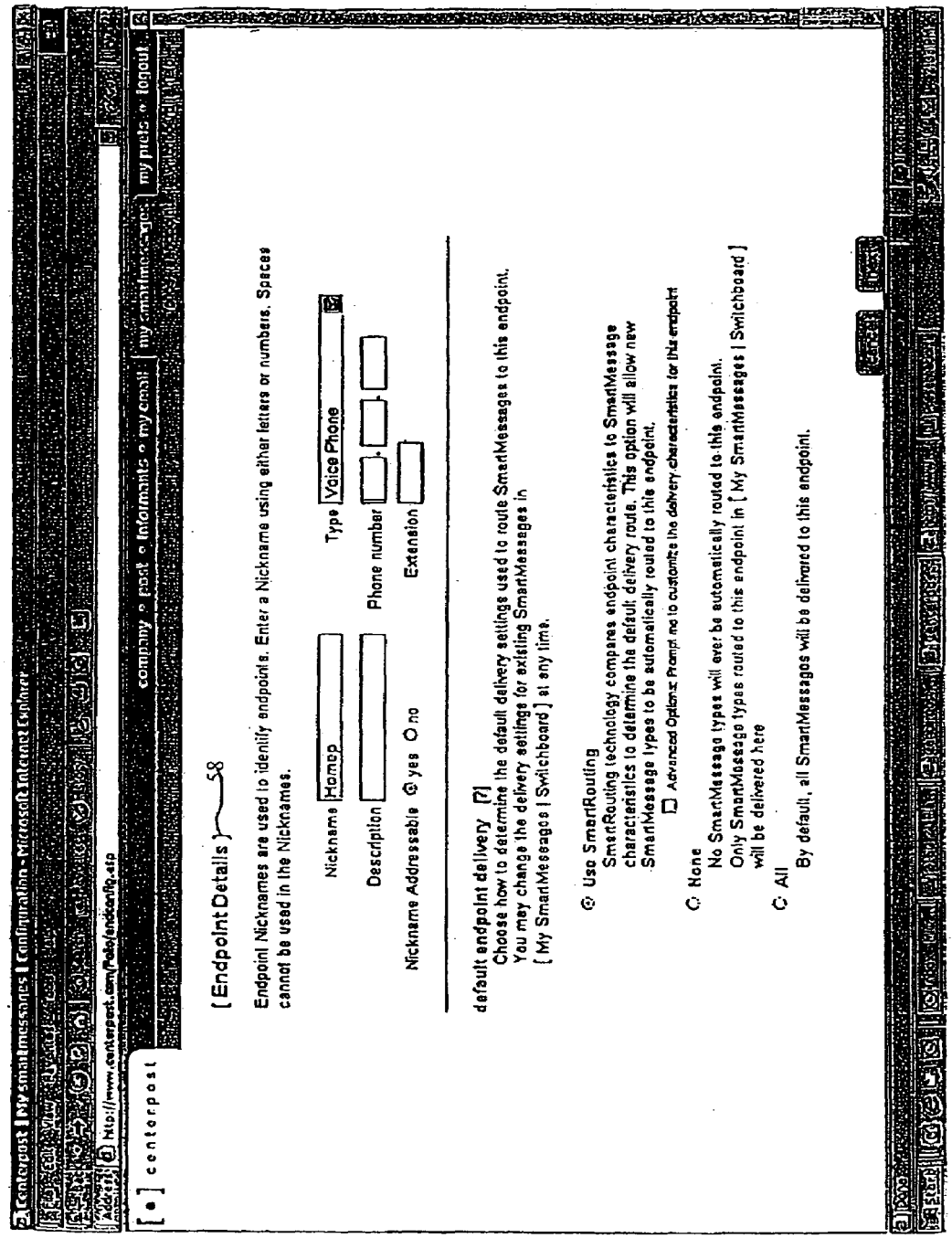
Figure 12C:
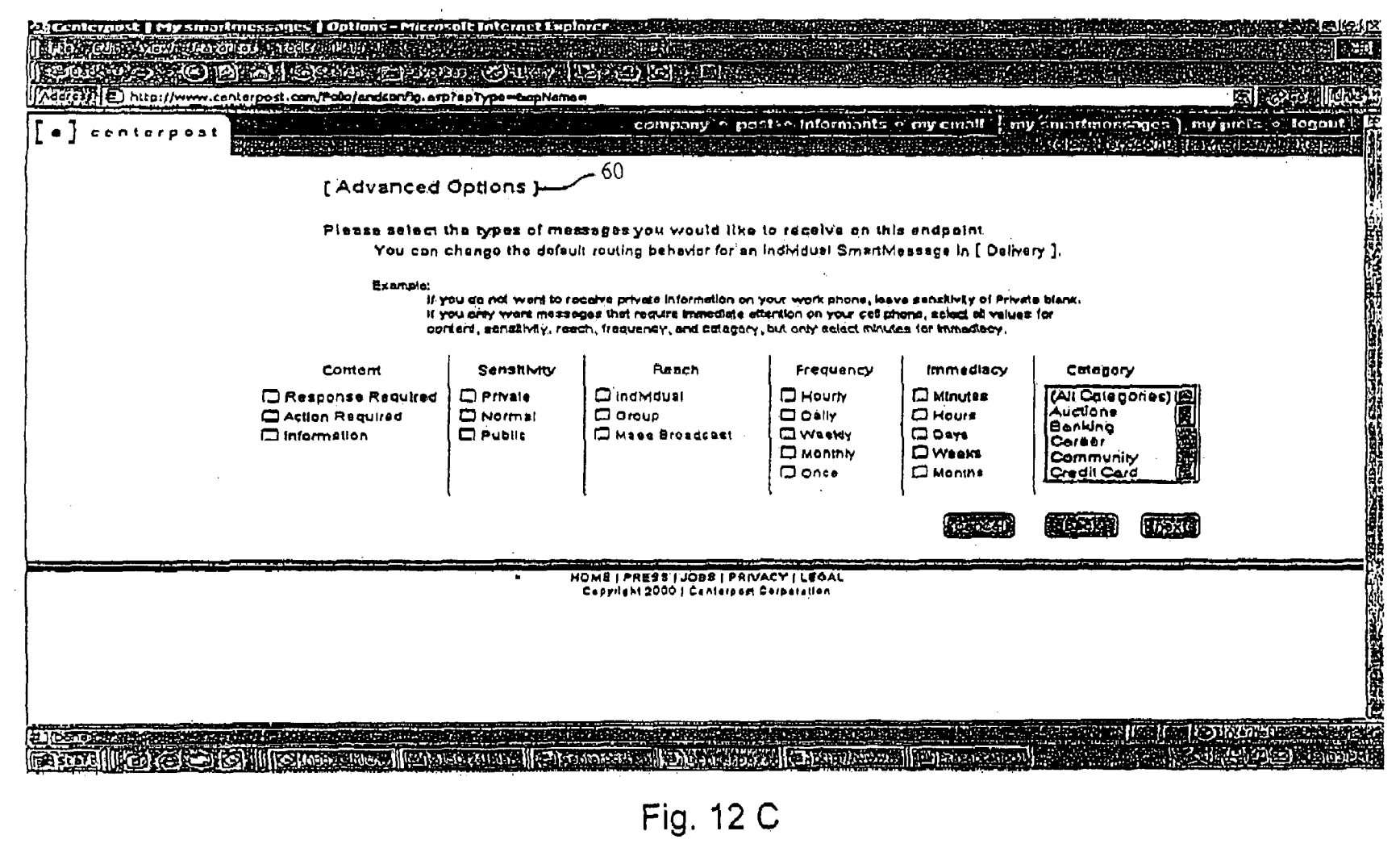
Figure 12:
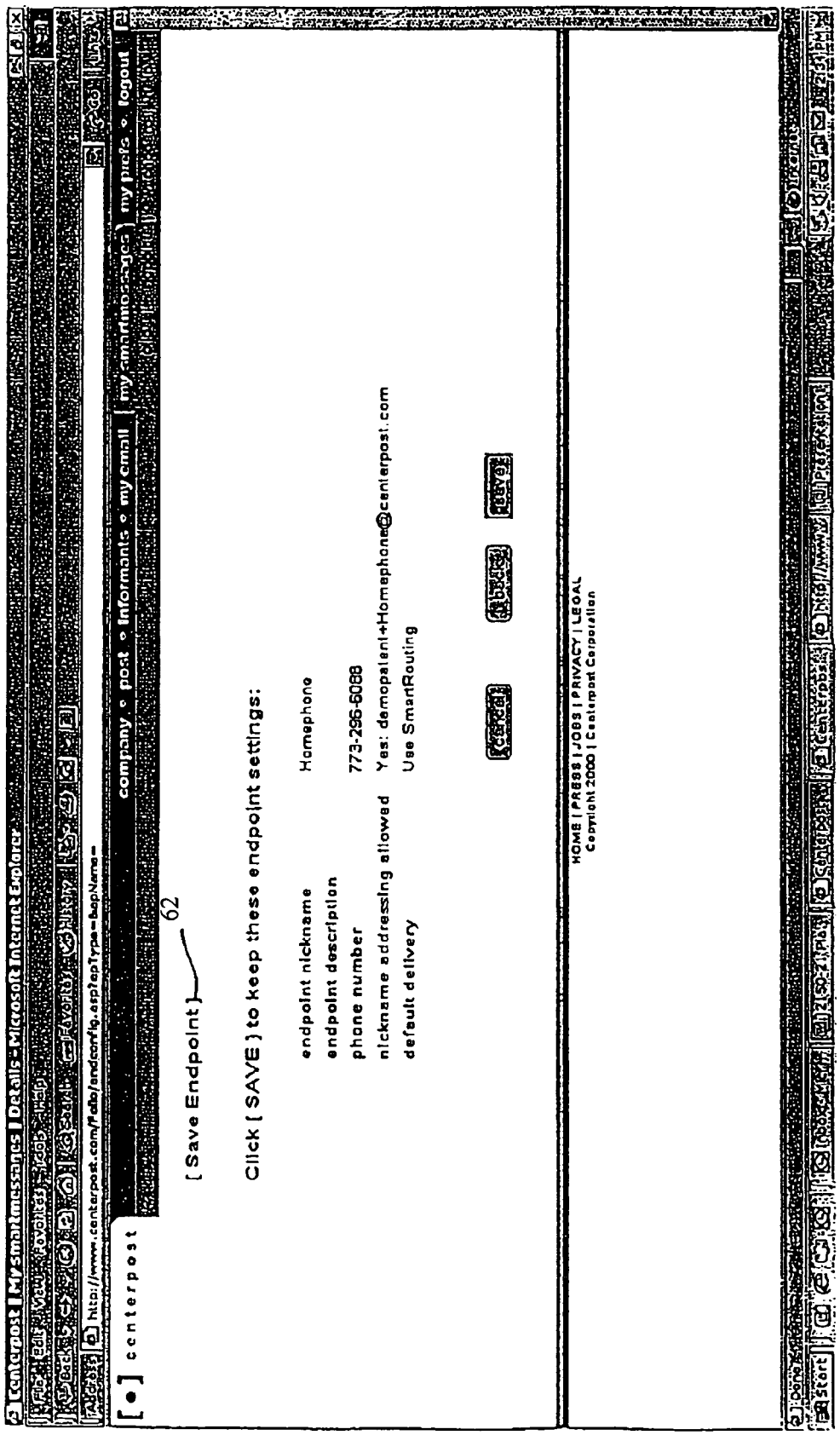
Figure 12:
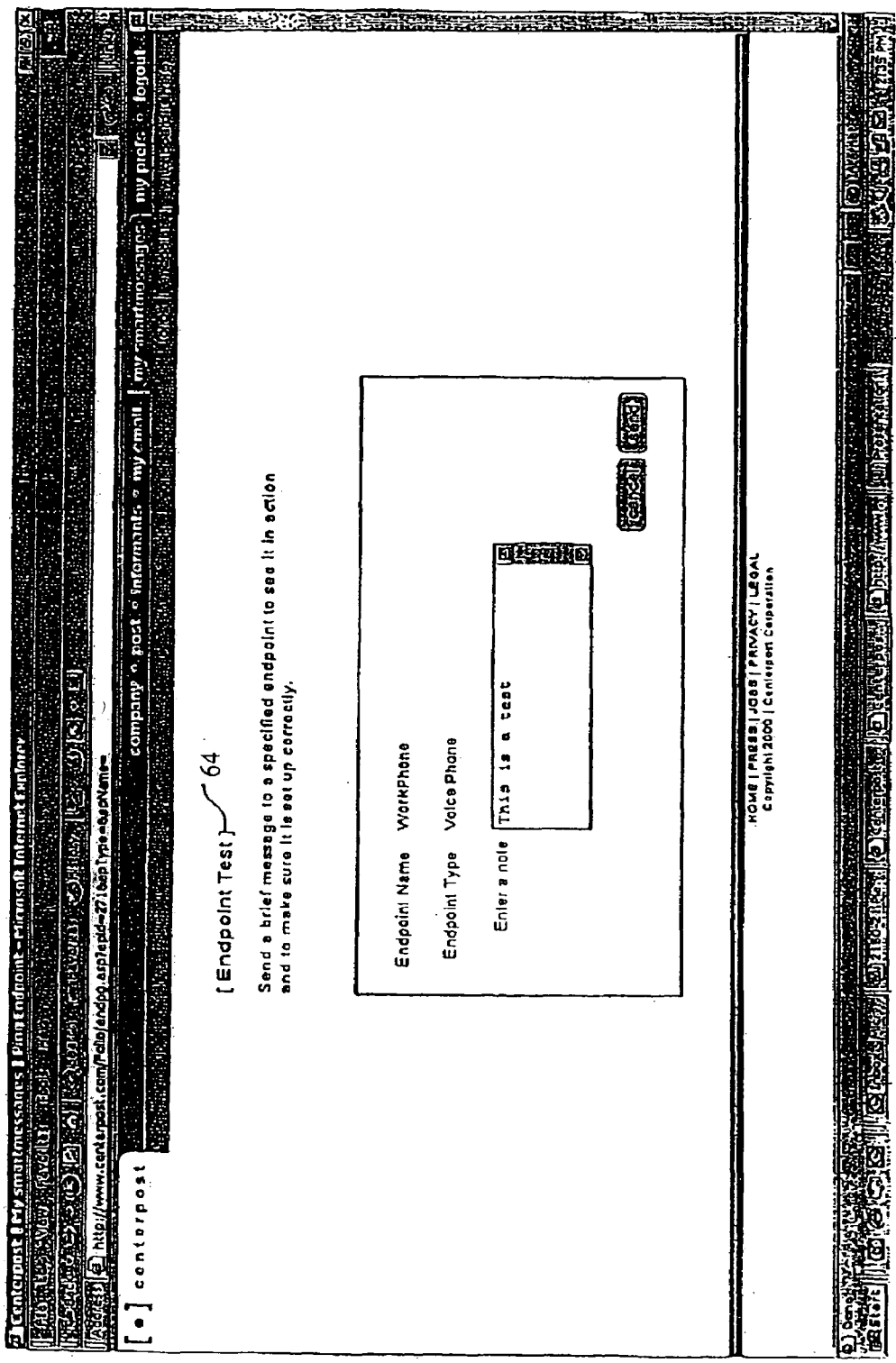
Figure 12:
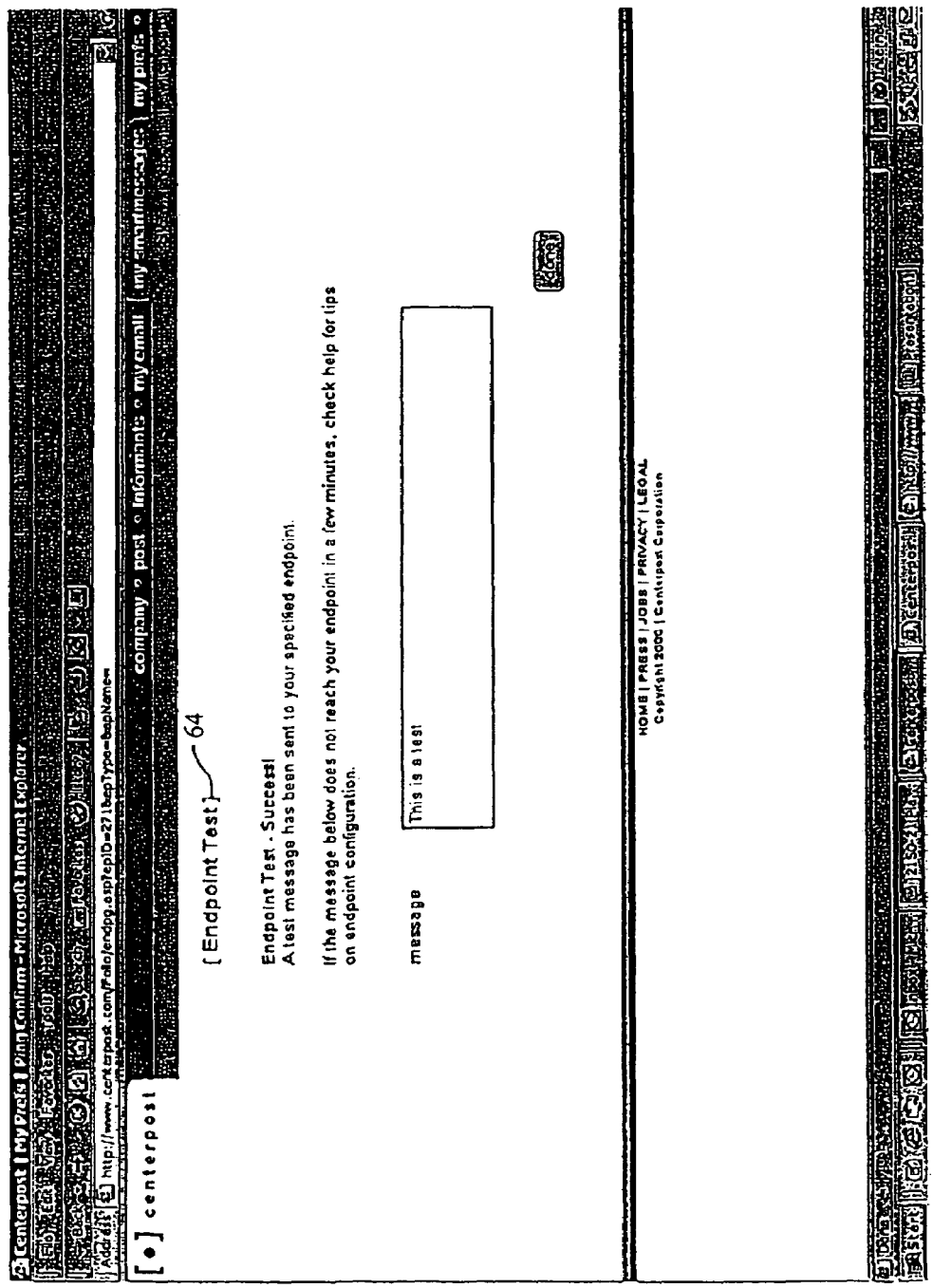

FIGS. 12A through 12F show examples of the display screens for the endpoint setup and management pertaining to the novel communications platform. In order to utilize the novel platform, a subscriber must configure one or all of the endpoints 12 to be used on the platform. Once in the platform's website, the user can enter the endpoints web page to add a particular endpoint 12 to the communications platform. FIG. 12A is a screen print of the endpoint setup page for the Centerpost communications platform. On this web page, each of the subscriber's endpoints 12 is defined, including the type of endpoint 50, any nickname 52 given to that endpoint, a description 54, device settings and options 56. FIG. 12B is an example of a web page that describes the details 58 for a particular endpoint, in this case, the subscriber's HTML Email. The subscriber can modify the details for this endpoint at this page, i.e., route certain SmartMessages to this endpoint, route all SmartMessages to this endpoint, etc.

The platform will allow the user to view and interact with the interface used to control his endpoints, from other communications channels aside from a website, such as from a voice phone using voice recognition or a WAP browser. The user thus will be able to, for example, adjust delivery preferences and folio preferences from his PDA or mobile phone.

FIG. 12C is an example of a web page that allows the subscriber to modify certain advanced options 60 for a particular endpoint. For example, the types of messages that the user would like to receive at this endpoint, etc.

Once all of the information has been entered for a particular endpoint 12, the subscriber enters the Save Endpoint 62 web page as shown in FIG. 12D. This page allows the user to save all of the information previously entered pertaining to that particular endpoint. FIGS. 12E and 12F show the screen prints for the Endpoint Test 64 web pages. The subscriber can use these pages to test his endpoint and the configuration thereof.

Figure 13:
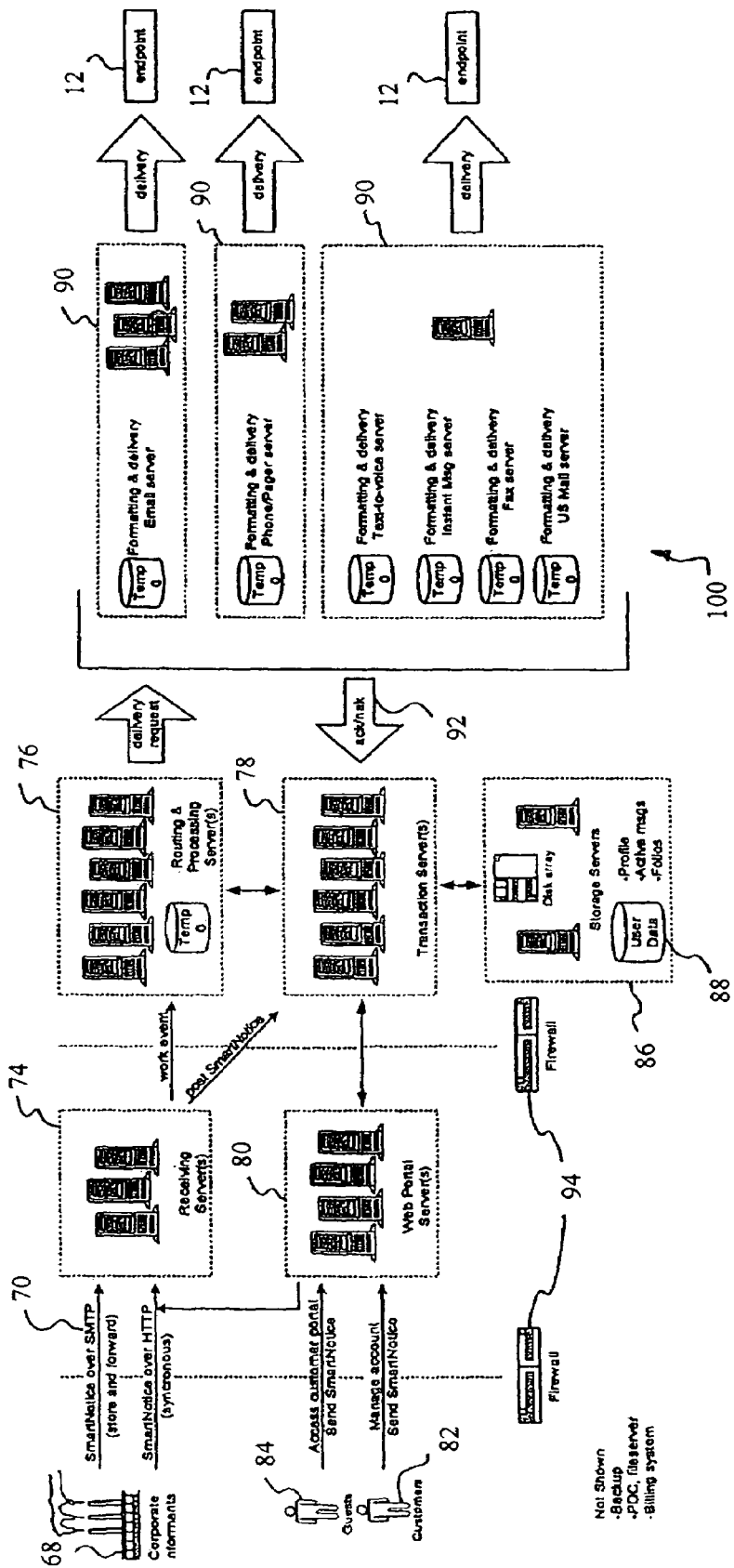
FIG. 13 shows an example of the development architecture for the communications platform 100 of the present invention.

FIG. 13 shows an example of the deployment architecture for the communications platform 100 of the present invention. In this example, a SmartMessage 10 is delivered, either using the Simple Mail Transfer Protocol (SMTP) 70 or the Hypertext Transfer Protocol (HTTP) 72, to a receiving server 74. The message is transmitted to routing and processing servers 76 or transaction servers 78 (or both). Transaction servers 78 interact with web portal servers 80, which are accessible by customers 82 of the system and by particular guests 84. Transaction servers 78 also interact with various storage servers 86 to access user data information 88 such as customer profiles, folios, messages, and other data. Further, the routing and processing servers 76 may deliver messages and other information to various other servers 90 for formatting and delivery to particular endpoints 12. These servers include email, phone or pager, text-to-voice, instant message, facsimile and US mail servers, among others. The messages are then delivered to the particular endpoints 12. Further processing may include an acknowledgement 92 (or lack thereof), which may be sent back to the original sender through the transaction server 78 and web portal server 80. Also, firewalls 94 can be incorporated throughout the platform architecture in order to safeguard information transmitted over the communications platform 100.

Figure 14:
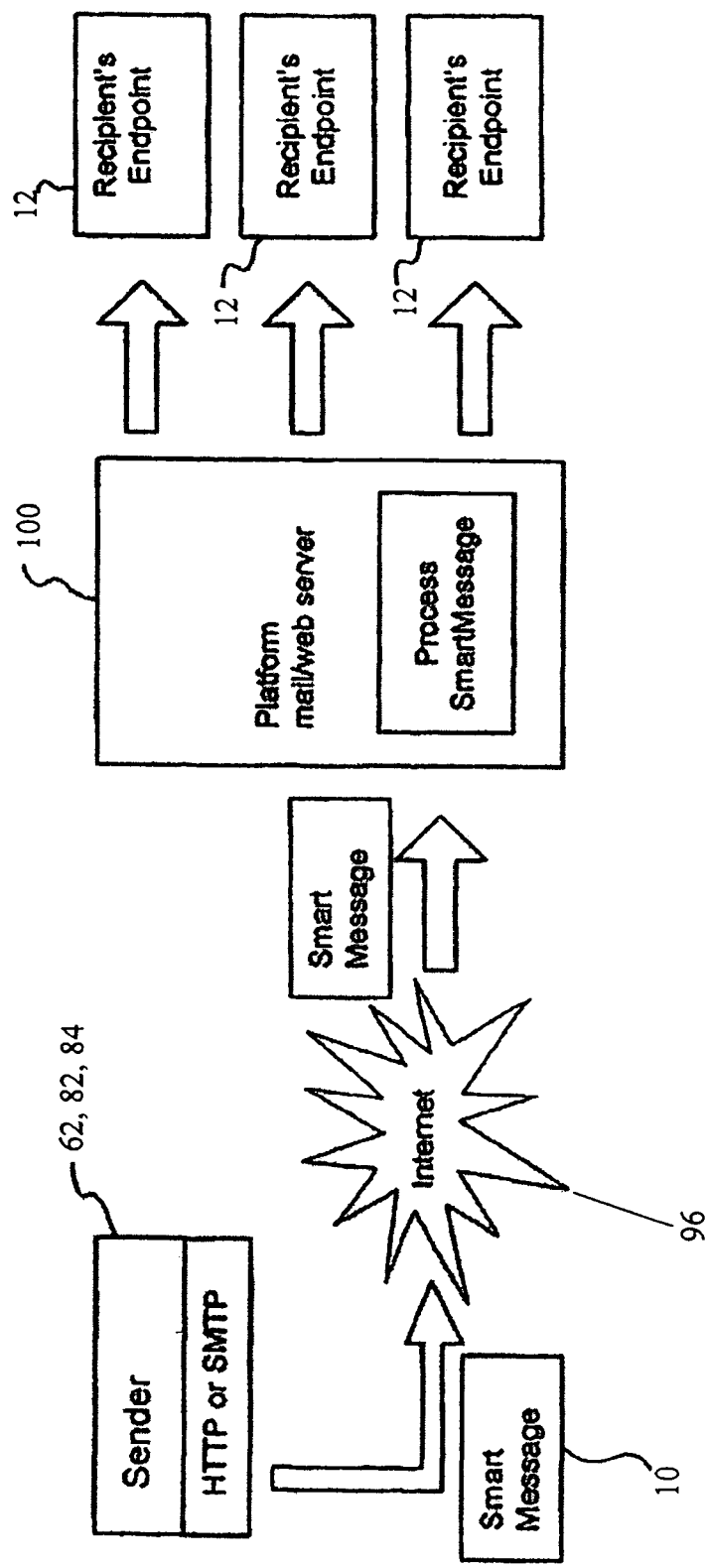
FIG. 14 represents the simplified flow of a message from the sending source 68, 82, 84 to a SmartMessage processing server.

FIG. 14 represents the simplified flow of a message from the sending source 68, 82, 84 to a SmartMessage processing server. As described above, SmartMessages 10 can be delivered to a SmartMessage processing platform for processing using two of the most commonly used protocols on the internet today—SMTP and HTTP 70, 72.

Initially, (as shown as A in FIG. 14) the Sender 68, 82, 84 generates a SmartMessage 10 and packages it in an email to be sent via SMTP 70, or in a HTTP 72 form to be posted through the HTTP protocol. The SmartMessage 10 travels via the protocol through the Internet 96 and is routed to the platform "mail" server (if sent via SMTP 70) or "web" server (if sent via HTTP 72). The mail/web server processes the incoming package and extracts the SmartMessage 10 from the HTTP 72 request or SMTP 70 mail message. Then the SmartMessage 10 is validated and processed. The SmartMessage 10 is then stored and potentially transmitted and formatted to the recipient's chosen endpoints 12, such as email, wireless, fax, etc.

Another aspect of the present invention is an intelligent message delivery platform (Centerpost SmartDelivery), complete with a user interface, which provides many of the advantages of MessageML, without the need for an individual to open a new MessageML account. A corporation can utilize the Centerpost SmartDelivery platform as a service whereby the corporate customers can benefit from the Centerpost platform from the corporation's web site.

SmartDelivery is a service that can be offered via the Centerpost Platform as that platform is described above. The SmartDelivery service allows individuals to experience the benefits of MessageML only on messages from the company sponsoring the SmartDelivery service, or on messages from outside parties approved by the company sponsoring the SmartDelivery service. The SmartDelivery service provides a user interface, which is seamlessly integrated into the corporation's existing web site. These SmartDelivery accounts can be specific to a given corporation, providing these corporations the ability to send SmartMessages (as described herein) to their customers or users through the Centerpost platform. The corporation may also house the user's messaging interface on the corporation's own website.

The SmartDelivery service is designed to provider users with as much of the functionality of the SmartMessage service, without requiring these users to establish a new MessageML account. Instead of creating a new Centerpost account, users can easily complete a user profile on the partner corporation's website, which will identify their endpoints and other information. By completing the user profile, using an easy point and click interface, users can control which messages they receive from the partner corporation, and on which endpoints these messages are received. This function can be accomplished within their existing (or a new) account on the partner corporation's website. For example, after logging in to a user's existing account on a brokerage firm's website, brokerage customers users may be able to set up and manage their SmartDelivery account directly on the brokerage's website, similar to other features located on the brokerage's website.

The SmartDelivery service is necessary because corporations want to offer the advanced messaging features as described above without requiring users to create new accounts. SmartDelivery may include all or a subset of the functionality offered in the Centerpost SmartMessage platform, including folios, endpoints, delivery, settings, etc. Consequently, the Centerpost SmartDelivery service provides a benefit to users as well as to corporations. Users can have messages delivered to a single or multiple endpoints in a matter of seconds. Thus, if a user is not sure whether he will be in his office or in transit, a message can be sent to his office telephone and his cellular telephone at the same time, thereby assuring that the user will receive the message as soon as possible. Additionally, users can easily control which messages they receive on which endpoints with an easy to use graphical interface. Users can also set up their inbox in a manner such that all messages received (and sent) are available for viewing in a single, self-organizing inbox.

With the Centerpost SmartDelivery Service, corporations can send information to their customers on a wide variety of devices (e.g., email, voice, fax, wireless, Instant Messenger). The corporation's customer service representatives can see an audit trail of all messages sent by the corporation, including time-stamped delivery reports.

The information or content pertaining to a particular corporation's SmartDelivery service will only be accessible through the corporation's website. In other words, users will be required to access the SmartDelivery service for a particular corporation through, for example, the user's accounts with that corporation. The functionality will be integrated into the corporation's website using a web page or frame to display Centerpost content. Certain elements of the interface may be customized in order to integrate the Centerpost content with the look and feel of the corporation's website.

In order to implement the Centerpost SmartDelivery platform, each corporation offering the SmartDelivery service would have its own domain of user names. The provider will be responsible for logging the user into their SmartDelivery account on the provider's website. SmartDelivery providers will have full read access to their customers' SmartDelivery accounts.

Only messages from the SmartDelivery provider (or selected partners of that provider) will be capable of being delivered to a user's SmartDelivery account with that provider. The corporation's platform could be configured such that one corporation could not send messages through the other corporation's SmartDelivery account. Thus, messages received from a sender not associated with the particular corporation, or an invalid sender, will be rejected by the system, unless the system is configured to let those messages be delivered. For example, if one stock brokerage company attempted to send a message to the SmartDelivery account of another brokerage firm's customer, the message would not be received by the customer's SmartDelivery account. However, if an airline, with the brokerage firm's permission, sent a message to the brokerage firm customer's SmartDelivery account, that message would be delivered to the account. Similarly, customers could not access their other SmartDelivery accounts with one provider through the website of another provider. (In other words, customers could not access their SmartDelivery account with an airline through their SmartDelivery account with a brokerage firm, or vice versa, unless both SmartDelivery providers permitted it.)

However, if users established a SmartMessage account, messages from their various SmartDelivery accounts could be forwarded to their SmartMessage account without modifying the SmartMessage content. Consequently, these messages would then be managed and coordinated by the Centerpost Platform with full SmartMessage functionality.

Users can choose to forward all of their messages to a Centerpost SmartMessage account. All of the SmartMessages that a user would normally receive at the corporation's SmartDelivery account will be routed to that user's Centerpost SmartMessage account and will be found in the user's SmartDelivery Folio. While the user will not need to access the folio on the corporation's website, the corporation will have the ability to view the user's messages (those that were originally sent to the user at the corporation's SmartDelivery account) through their administrative or customer support site.

Figure 3A:
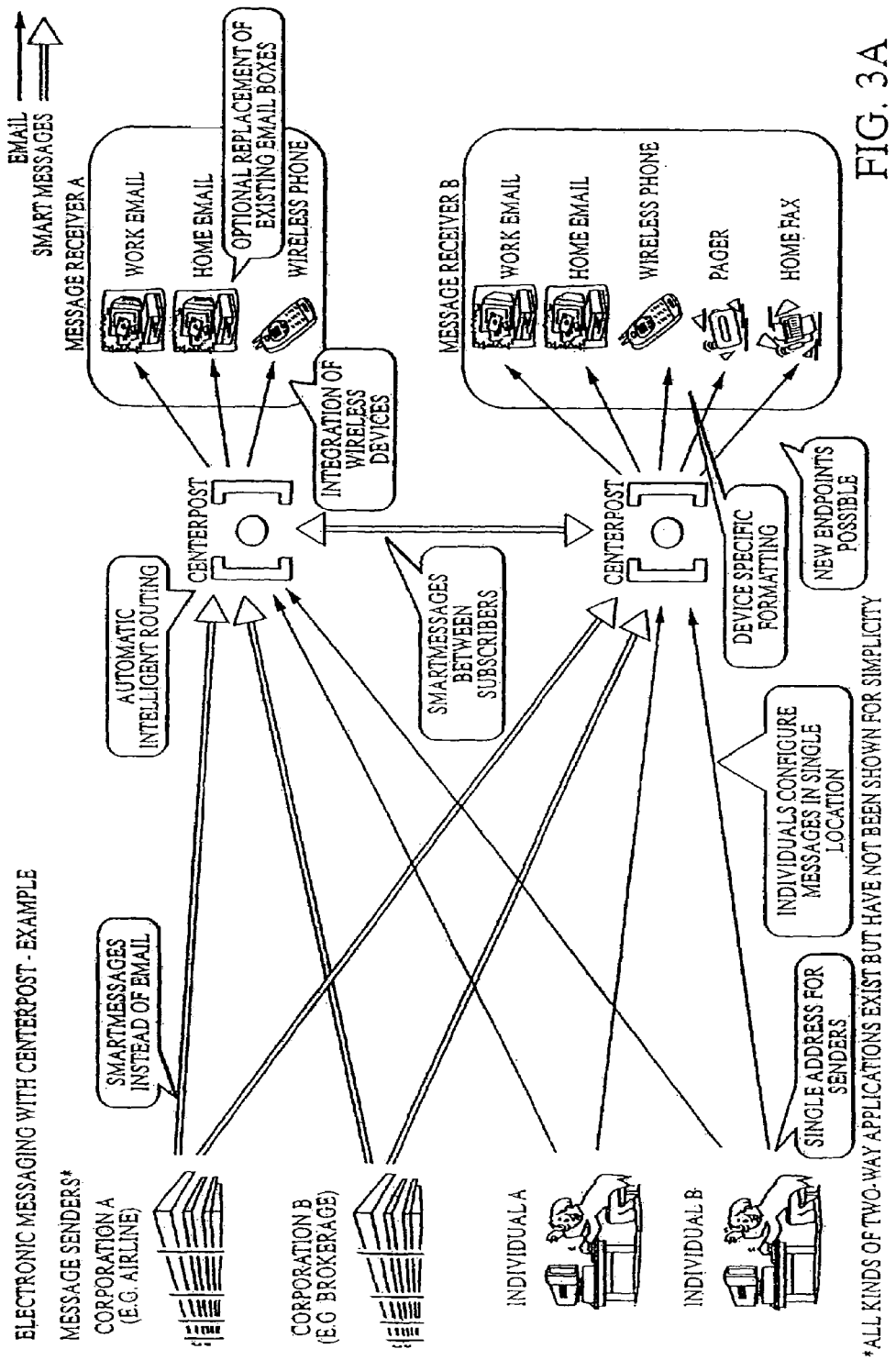
FIGS. 3A through 3C are block diagrams and charts displaying and indicating electronic messaging with the novel communications platform, along with examples of interactions available due to the platform.
Figure 3B:
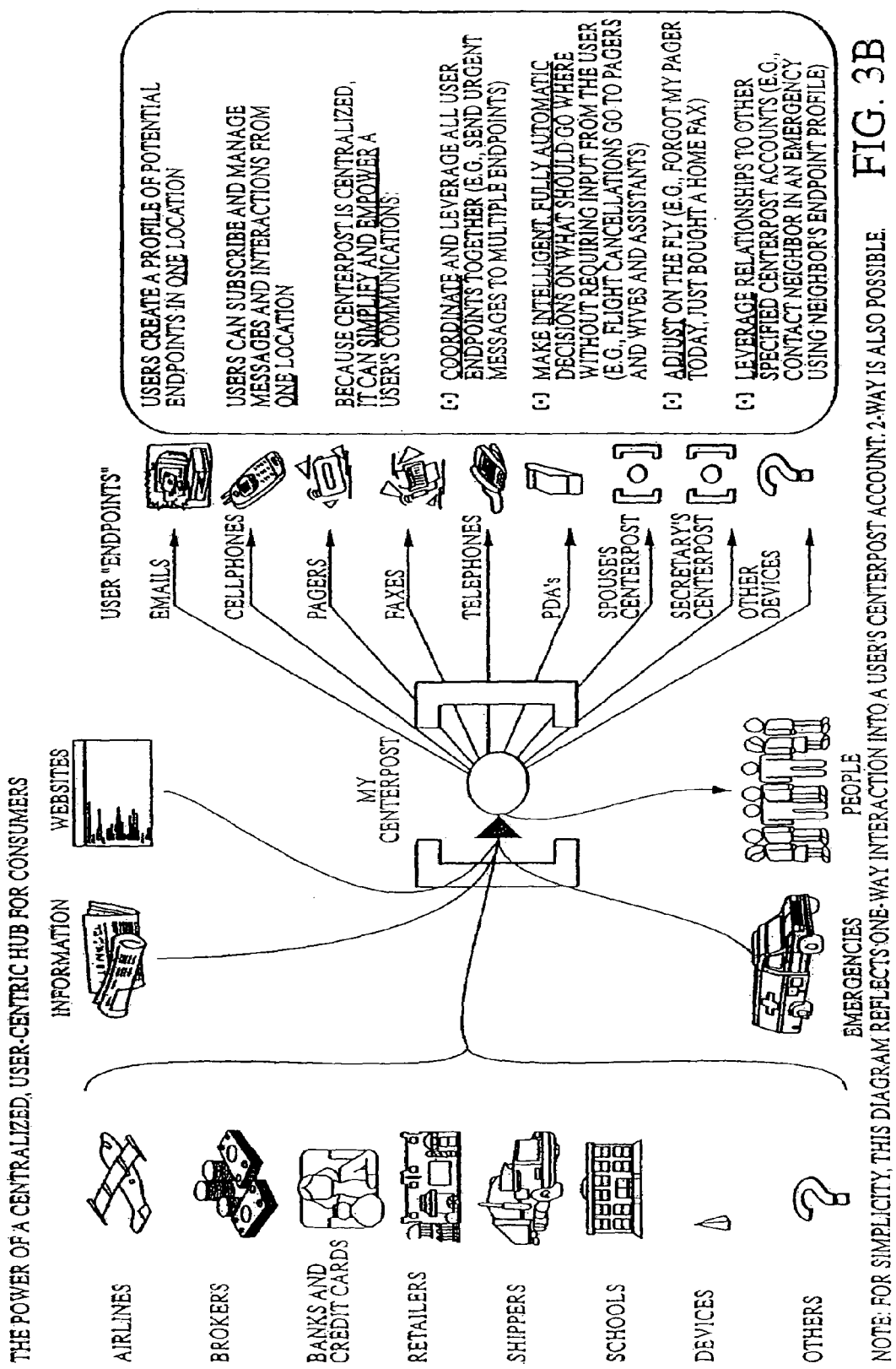
Figures 1, 3C:
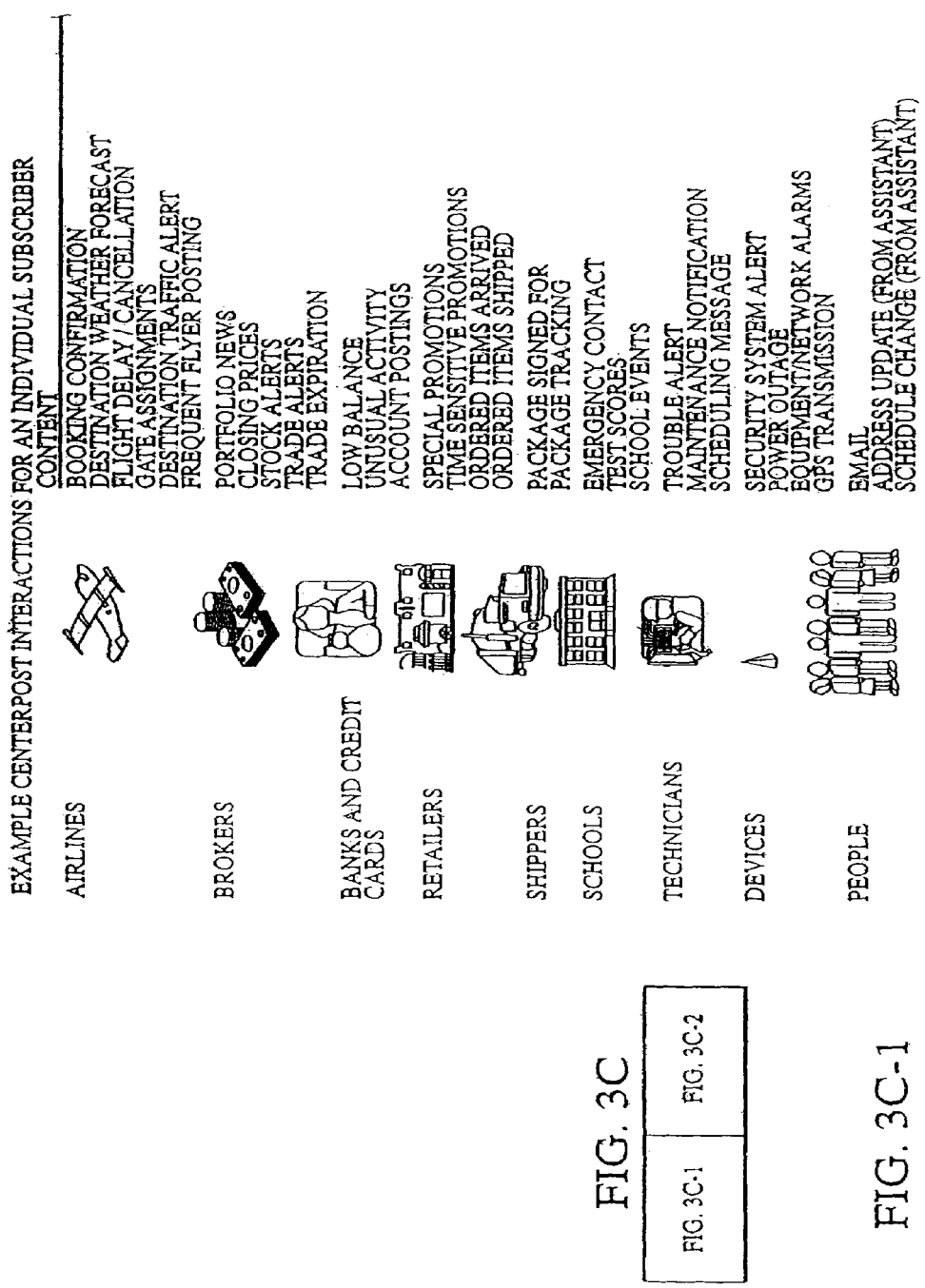

Certain example applications are listed below (see FIG. 3C for additional example applications).

An airline can electronically accompany customers through their travel itinerary:
    Send ticket confirmation to work email inbox.
    Send confirmation of rental car booking
    Send destination weather report to home fax machine 24 hours prior to departure to aid packing.
    Send gate, baggage claim area, and local traffic report to pager 30 minutes prior to landing.
    Send a flight delay alert 1 hour before scheduled departure
    Send flight landing confirmation to secretary's email.
    The above events can be posted to an activity created around a specific trip itinerary.

Security monitoring companies can keep homeowners aware of activity:
    Send alarm notifications to all of spouses' endpoints: work email, pager, PCS phone, and fax.
    Send consolidated alarm on/off activity to personal email once/week
    The above events can be posted to an activity created around the home alarm status Television and media companies can keep customers aware of changing offerings:
    Send TV programming episode information to personal email 24 hours in advance.
    Send NFL football programming to pager every Sunday morning.
    Send special interest radio programming to work email each morning at start of business.
    Send announcements of movie premiers and local theater info as they occur.
    Send rental movie titles once/week to personal email.
    The above events can be posted to activities organized around program types or time frames.

Financial service firms can send customers all sorts of information, and know their customers will find it manageable because they are SmartMessages:
    Send security price, volume, and analyst estimate change alerts to work email and pager.
    Send check clearing notification to personal email.
    Send trade confirmation to personal email.
    Send portfolio positions report to personal email once every business day.
    Activities can be created around a person's portfolio, the monthly investment statement, or watch lists.

Retailers and manufacturers can proactively keep customers informed of their order flow:
    Send order confirmations to personal email.
    Send shipment and order confirmations to a "folio" for subsequent easy retrieval and review.
    Send updates on status of long-running or custom-manufactured orders, such as backorder arrived, in route to dealer, and product in test.
    Activities can be created around specific orders.

The foregoing detailed description of the invention is intended to be illustrative and not intended to limit the scope of the invention. Changes and modifications are possible with respect to the foregoing description, and it is understood that the invention may be practiced otherwise than that specifically described herein and still be within the scope of the claims.

The invention claimed is:

1. A apparatus for routing an electronic message from a sender to at least one endpoint for a user comprising a processor for executing logic for:
receiving the electronic message for the user by the processor, the electronic message comprising a
message, a routing indicator, and at least one of a stylesheet or a reference to the stylesheet, the stylesheet including a definition of at least one of a plurality of routing indicators, the routing indicator in the electronic message being at least one of the plurality of routing indicators;
accessing the stylesheet;
interpreting the routing indicator in the electronic message based on the definition in the stylesheet;
selecting at least one endpoint from the plurality of endpoints based on the routing indicator and a user-defined endpoint table, the endpoint table specifying at least one endpoint based on the routing indicator with the endpoint table specifying different endpoints based on different routing indicators; and
routing at least a portion of the electronic message to the at least one endpoint.

2. The apparatus of claim 1, wherein the endpoint table is defined by the user prior to receiving the electronic message.

3. The apparatus of claim 1, wherein the routing indicator is an XML routing indicator.

4. The apparatus of claim 1, wherein the endpoint is selected from the group consisting of an electronic mail box, a wired or wireless telephone, a facsimile machine, a paging device, a web site, a personal digital assistant, and an instant messenger account.

5. The apparatus of claim 1, wherein the logic for receiving the electronic message, selecting at least one endpoint are routing are performed by a server; and
wherein the stylesheet includes definitions of each of the plurality of routing indicators.

6. The apparatus of claim 1, wherein the routing indicator comprises an attribute of the electronic message.

7. The apparatus of claim 6, wherein the attribute is selected from the group consisting of reach, immediacy, sensitivity, content, expiration, and context.

8. The apparatus of claim 6, wherein the attribute of the electronic message is selected from a plurality of attributes; and
wherein the stylesheet including definitions for the plurality of attributes.

9. The apparatus of claim 8, wherein the apparatus comprises a server that accesses the stylesheet based on the reference in the electronic message to define the attribute.

10. The apparatus of claim 6, wherein the attribute of the electronic message comprises immediacy indicating time sensitivity of the electronic message; wherein the endpoint table comprises user-assigned endpoints based on the immediacy of the electronic message; and
wherein the server reviews the electronic message for the immediacy attribute to determine, based on the endpoint table, to which endpoint to route at least a portion of the electronic message.

11. The apparatus of claim 10, wherein the server routes at least a portion of the electronic message to a plurality of endpoints based on the immediacy attribute.

12. The apparatus of claim 10, wherein the apparatus comprises a server; wherein the routing indicator comprises an event associated with the electronic message;
wherein the endpoint table comprises at least one user-assigned endpoint based on the event of the electronic message; and
wherein the server reviews the electronic message for the event to determine, based on the endpoint table, to which endpoint to route at least a portion of the electronic message.

13. The apparatus of claim 12, wherein the endpoint table comprises for each of a plurality of events at least one associated user-assigned endpoint.

14. The apparatus of claim 13, wherein the electronic message further comprises a reference to a stylesheet, the stylesheet including definitions for the plurality of events.

15. The apparatus of claim 14, wherein the server accesses the stylesheet based on the reference in the electronic message to define the event.

16. The apparatus of claim 15, wherein the stylesheet further comprises formatting data for the plurality of events on the plurality of endpoints;
further comprising formatting at least a portion of the electronic message based on the stylesheet, the event in the message payload, and the at least one endpoint; and
wherein routing at least a portion of the electronic message comprises routing at least a portion of the formatted electronic message.

17. The apparatus of claim 1, wherein the logic for receiving an electronic message comprises logic for receiving the electronic message from a sender address, and further comprising logic for:
accessing a stylesheet, the stylesheet comprising at least one valid transport source comparing the sender address with the at least one valid transport source; and
rejecting the electronic message if the sender address does not match the at least one valid transport source.

18. The apparatus of claim 17, wherein the electronic message further comprises a reference to the stylesheet, and
wherein the logic for accessing a stylesheet comprises logic for accessing the stylesheet based on the reference in the electronic message.

19. The apparatus of claim 17, wherein the sender address is selected from the group consisting of a physical ip address, a domain, and an smtp email account.

20. The apparatus of claim 1, further comprising logic for formatting at least a portion of the electronic message, and
wherein the logic for routing at least a portion of the electronic message comprises logic for routing at least a portion of the formatted electronic message.

21. The apparatus of claim 20, wherein the electronic message comprises formatting data for at least a portion of the electronic message, and
wherein the logic for formatting comprises logic for formatting at least a portion of the electronic message with the formatting data.

22. The apparatus of claim 21, wherein the formatting data in the electronic message comprises formatting data for formatting at least some of the electronic message on each of the plurality of endpoints; and
wherein the logic for formatting comprises logic for formatting with the formatting data for the at least one endpoint.

23. The apparatus of claim 20, wherein the electronic message comprises a standard envelope containing the message payload and XML formatting information; and
wherein the logic for formatting at least a portion of the electronic message comprises logic for formatting the standard envelope using the XML formatting information for presentation on any of a plurality of endpoints.

24. The apparatus of claim 23, wherein the logic for formatting the standard envelope comprises logic for transforming at least a portion of the message payload using the XML formatting information into at least one of a plurality of formats.

25. A apparatus for routing an electronic message relating to an activity from a sender to at least one of a plurality of endpoints for a user, the activity comprising a plurality of events that occur for the activity, the system comprising a processor for executing logic for:
generating a user-defined endpoint table based on input received from the user by the processor;
the input identifying which endpoint, from the plurality of endpoints for the user, to send an electronic message to for the plurality of events with one endpoint being identified for one event and a second endpoint being identified for a second event;
receiving the electronic message for the user, the electronic message comprising a message and a routing indicator, the routing indicator in the electronic message indicative of at least one of the events for the activity;
selecting at least one endpoint from the plurality of endpoints based on the routing indicator and the user-defined endpoint table, with different routing indicators indicative of different events being used with the user-defined table to select different endpoints;
and routing at least a portion of the electronic message to the at least one endpoint.

26. The apparatus of claim 25, further comprising logic for:
receiving formatting data for formatting at least some of the electronic message on each of the plurality of endpoints; and
formatting at least a portion of the electronic message based on the formatting data for the at least one endpoint, wherein the formatting data comprises a stylesheet.

27. The apparatus of claim 26, wherein the electronic message includes the routing indicator and a reference to the stylesheet.

28. The apparatus of claim 27, wherein the reference comprises a URL address where the stylesheet resides, and
wherein the logic for receiving formatting data comprises logic for accessing the stylesheet at the URL address where the stylesheet resides.

29. The apparatus of claim 25, wherein the electronic message comprises at least one of a stylesheet or a reference to a stylesheet, the stylesheet including a definition of the routing indicator; and
further comprising logic for interpreting the routing indicator in the message payload based on the definition of the routing indicator in the stylesheet.

30. A apparatus for routing an electronic message from a sender to at least one of a plurality of endpoints for a user, the system comprising a processor for executinci logic for:
receiving the electronic message for the user by the processor, the electronic message comprising a message payload and a reference to at least one stylesheet, the message payload including a message and a routing indicator, the at least one stylesheet including formatting data and definitions of a plurality of routing indicators, the routing indicator in the message payload being one of the plurality of routing indicators, the formatting data for formatting at least a part of the message on each of the plurality of endpoints;
accessing the stylesheet, based on the reference;
interpreting the routing indicator in the message payload based on the definitions of the plurality of routing indicators in the stylesheet;
selecting at least one endpoint from the plurality of endpoints based on the routing indicator and a user-defined endpoint table, the endpoint table specifying at least one endpoint based on the routing indicator;
formatting at least a portion of the message based on the formatting data for the at least one endpoint; and
routing at least a portion of the formatted message to the at least one endpoint.

* * * * *